United States Patent
Hyde et al.

(10) Patent No.: US 10,304,068 B2
(45) Date of Patent: May 28, 2019

(54) ESTIMATING FEES AND COSTS INCURRED BY A PATIENT RECEIVING A HEALTHCARE SERVICE

(71) Applicant: Elwha LLC, Bellevue, WA (US)

(72) Inventors: Roderick A. Hyde, Redmond, WA (US); Muriel Y. Ishikawa, Livermore, CA (US); Jordin T. Kare, Seattle, WA (US); Eric C. Leuthardt, St. Louis, MO (US); Elizabeth A. Sweeney, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 753 days.

(21) Appl. No.: 13/728,834

(22) Filed: Dec. 27, 2012

(65) Prior Publication Data

US 2014/0188491 A1    Jul. 3, 2014

(51) Int. Cl.
*G06Q 30/02*   (2012.01)
*G06Q 50/22*   (2018.01)

(52) U.S. Cl.
CPC ......... *G06Q 30/0206* (2013.01); *G06Q 50/22* (2013.01)

(58) Field of Classification Search
CPC .... G06F 19/00; G06F 19/328; G06F 19/3462; G06F 19/325; G06F 17/2785;
(Continued)

(56) References Cited

U.S. PATENT DOCUMENTS 6,266,645 B1   7/2001   Simpson
6,766,328 B2   7/2004   Stefanchik et al.
(Continued)

FOREIGN PATENT DOCUMENTS

JP   2003-281267 A   10/2003
JP   2005-202686 A   7/2005

OTHER PUBLICATIONS

"Efficiency in Health Care: What Does it Mean? How is it Measured? How Can it be Used for Value-Based Purchasing?"; Highlights from a National Conference; Prepared by AcademyHealth; Updated as of Nov. 6, 2006; 29 pages; Appendix A.
Hardin et al.; "Data Mining and Clinical Decision Support Systems"; www.cs.uky.edu/~goldsmit/DMCDSS.pdf; downloaded Dec. 13, 2012; pp. 44-63.
(Continued)

*Primary Examiner* — Maroun P Kanaan
(74) *Attorney, Agent, or Firm* — Foley & Lardner LLP

(57) ABSTRACT

Described embodiments include a computer-implemented method, device, and computer program product. A computer-implemented method includes electronically receiving a previously prepared estimate of fees and costs to deliver a diagnosis, treatment, or prevention of a particular disease, illness, injury, or other physical or mental impairment (hereafter "healthcare service") to a particular patient. The computer-implemented method includes electronically receiving data at least partially indicative of the healthcare service provided to the patient to date. The computer-implemented method includes estimating probable fees and costs incurred to date in providing the healthcare service to the particular patient. The estimating is responsive to the received data indicative of at least part of the healthcare service provided to date. The computer-implemented method includes outputting in substantially real time information indicative of the probable fees and costs incurred to date in view of the previous estimate of the fees and costs for providing the healthcare service.

45 Claims, 18 Drawing Sheets

(58) Field of Classification Search
CPC .... G06F 19/3418; G06Q 50/24; G06Q 10/06; G06Q 30/0206
See application file for complete search history.

(56) References Cited

U.S. PATENT DOCUMENTS

| | | | |
|---|---|---|---|
| 6,793,496 | B2 | 9/2004 | Edic et al. |
| 6,816,813 | B2 | 11/2004 | Tan et al. |
| 7,321,862 | B2 | 1/2008 | Rosenfeld et al. |
| 7,464,040 | B2 | 12/2008 | Joao |
| 7,464,042 | B2 | 12/2008 | Beraja et al. |
| 7,467,094 | B2 | 12/2008 | Rosenfeld et al. |
| 7,490,048 | B2 | 2/2009 | Joao |
| 7,613,620 | B2 | 11/2009 | Salwan |
| 7,720,201 | B2 | 5/2010 | Ito |
| 7,756,735 | B2 | 7/2010 | Sessions et al. |
| 7,797,172 | B2 | 9/2010 | Fitzgerald et al. |
| 8,010,384 | B2 | 8/2011 | Beraja et al. |
| 8,019,623 | B2 | 9/2011 | McCallie et al. |
| 8,050,938 | B1 | 11/2011 | Green, Jr. et al. |
| 8,082,160 | B2 | 12/2011 | Collins, Jr. et al. |
| 8,095,389 | B2 | 1/2012 | Dalton et al. |
| 8,165,897 | B2 | 4/2012 | Beraja et al. |
| 8,732,096 | B1 | 5/2014 | Glukhov |
| 8,788,293 | B2* | 7/2014 | Kennedy ................ G06F 19/328 705/4 |
| 2002/0196141 | A1 | 12/2002 | Boone et al. |
| 2003/0191669 | A1 | 10/2003 | Fitzgerald et al. |
| 2004/0030704 | A1 | 2/2004 | Stefanchik et al. |
| 2004/0034288 | A1 | 2/2004 | Hennessy et al. |
| 2004/0039600 | A1* | 2/2004 | Kramer ................ G06Q 50/22 705/2 |
| 2004/0172291 | A1 | 9/2004 | Knowlton |
| 2004/0172297 | A1 | 9/2004 | Rao et al. |
| 2004/0243441 | A1 | 12/2004 | Bocionek et al. |
| 2006/0080139 | A1 | 4/2006 | Mainzer |
| 2006/0085227 | A1 | 4/2006 | Rosenfeld et al. |
| 2007/0027711 | A1 | 2/2007 | Beraja et al. |
| 2007/0027727 | A1 | 2/2007 | Cochrane |
| 2007/0194939 | A1 | 8/2007 | Alvarez et al. |
| 2007/0271119 | A1* | 11/2007 | Boerger ................ G06F 19/328 705/2 |
| 2007/0290029 | A1 | 12/2007 | Fox et al. |
| 2008/0052117 | A1 | 2/2008 | Beraja et al. |
| 2008/0052128 | A1 | 2/2008 | Beraja et al. |
| 2008/0059249 | A1 | 3/2008 | Joao |
| 2008/0172251 | A1* | 7/2008 | Reichert ................ G06Q 50/22 705/2 |
| 2008/0303638 | A1 | 12/2008 | Nguyen et al. |
| 2009/0048865 | A1 | 2/2009 | Breazeale, Jr. |
| 2009/0112630 | A1 | 4/2009 | Collins, Jr. et al. |
| 2009/0177495 | A1 | 7/2009 | Abousy et al. |
| 2009/0243833 | A1 | 10/2009 | Huang et al. |
| 2010/0042440 | A1 | 2/2010 | Joao |
| 2010/0106529 | A1 | 4/2010 | McCallie et al. |
| 2010/0241448 | A1 | 9/2010 | Firminger et al. |
| 2010/0241454 | A1 | 9/2010 | Firminger et al. |
| 2010/0324936 | A1 | 12/2010 | Vishnubhatla et al. |
| 2011/0044691 | A1 | 2/2011 | Jung et al. |
| 2011/0112848 | A1 | 5/2011 | Beraja et al. |
| 2011/0112849 | A1 | 5/2011 | Beraja et al. |
| 2011/0112850 | A1 | 5/2011 | Beraja et al. |
| 2011/0113382 | A1 | 5/2011 | Cannon et al. |
| 2011/0166883 | A1 | 7/2011 | Palmer et al. |
| 2011/0213625 | A1 | 9/2011 | Joao |
| 2011/0246225 | A1 | 10/2011 | Green, III et al. |
| 2011/0301977 | A1 | 12/2011 | Belcher et al. |
| 2012/0095352 | A1 | 4/2012 | Tran |
| 2012/0212582 | A1 | 8/2012 | Deutsch |
| 2012/0221349 | A1 | 8/2012 | Mora |
| 2013/0144642 | A1 | 6/2013 | Bessette |
| 2014/0077968 | A1* | 3/2014 | Alberth, Jr. ............. G07F 15/10 340/870.02 |
| 2014/0358974 | A1 | 12/2014 | Romani Also et al. |

OTHER PUBLICATIONS

"Prediction Intervals"; http://www.oswego.edu/~srp/stats/pi.htm; printed on Dec. 4, 2012; pp. 1-3.
"The distinction between confidence intervals, prediction intervals and tolerance intervals"; GraphPad—FAQ 1506; http://graphpad.com/support/faq/the-distinction-between-confidence-intervals-prediction-intervals-and-tolerance-intervals/; printed on Dec. 4, 2012; pp. 1-2.
Butler, J. R. G.; Hospital Cost Analysis; 1995; total of 34 pages; Springer Science+Business Media Dordrecht.
PCT International Search Report; International App. No. PCT/US2013/076112; dated Apr. 18, 2014; pp. 1-3.

* cited by examiner

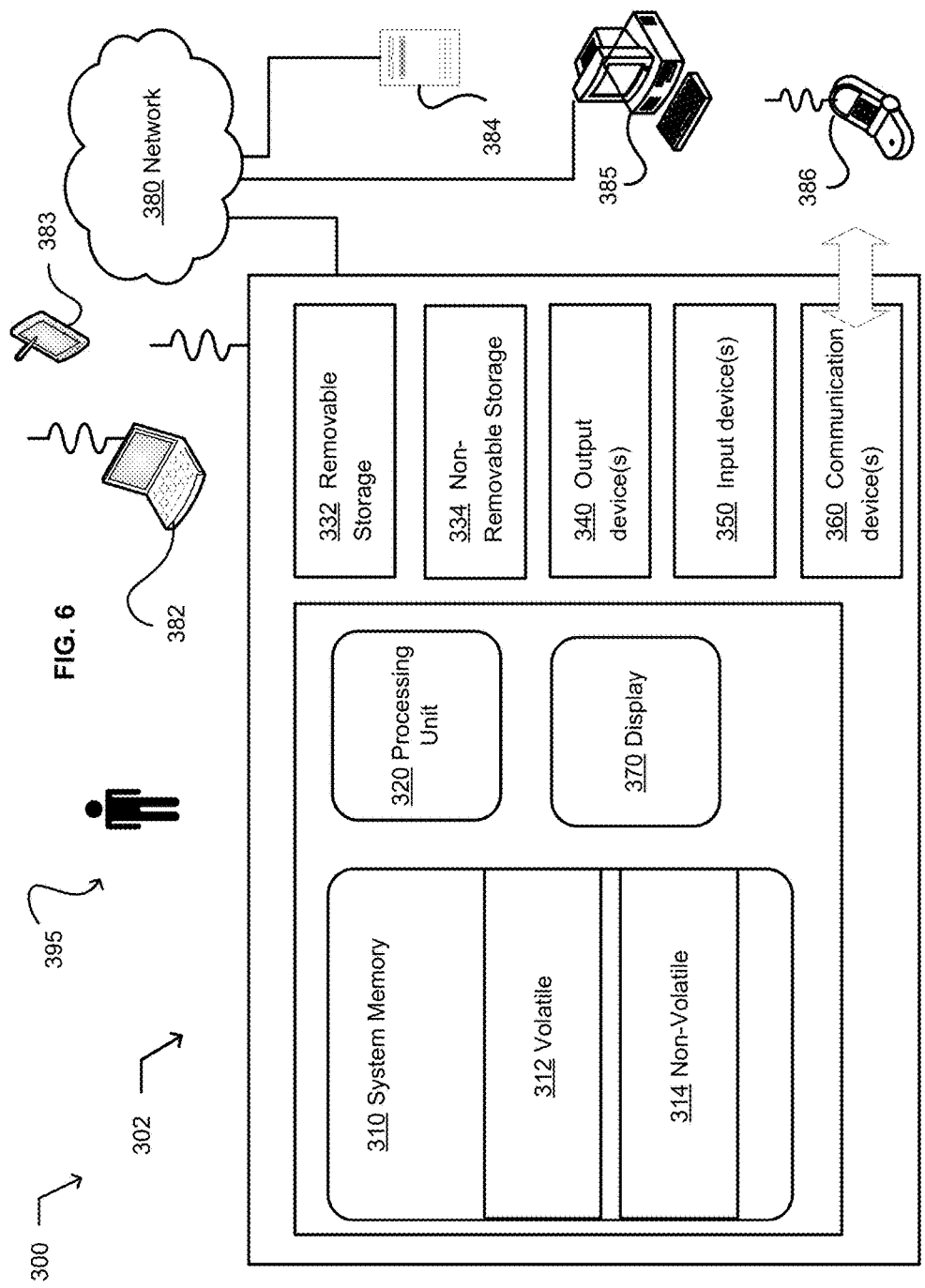

410 Computer-readable media.

420 Program instructions which, when executed by a processor of a computing device, cause the computing device to perform a process including:
(i) receiving a previously prepared estimate of fees and costs to deliver a diagnosis, treatment, or prevention of a particular disease, illness, injury, or other physical or mental impairment (hereafter "healthcare service") to a particular patient;
(iii) receiving data at least partially indicative of the healthcare service provided to the patient to date;
(iv) estimating probable fees and costs incurred to date in providing the healthcare service to the particular patient, the estimating responsive to the received data partially indicative of the healthcare service provided to the patient to date; and
(v) outputting information indicative of the probable fees and costs incurred to date in view of the previous estimate of the fees and costs for providing the healthcare service.

422 (ii) receiving a request for information indicative of fees and costs incurred to date in providing the healthcare service to the particular patient.

412 The computer-readable media includes a tangible computer storage media.

414 The computer-readable media includes a communications media.

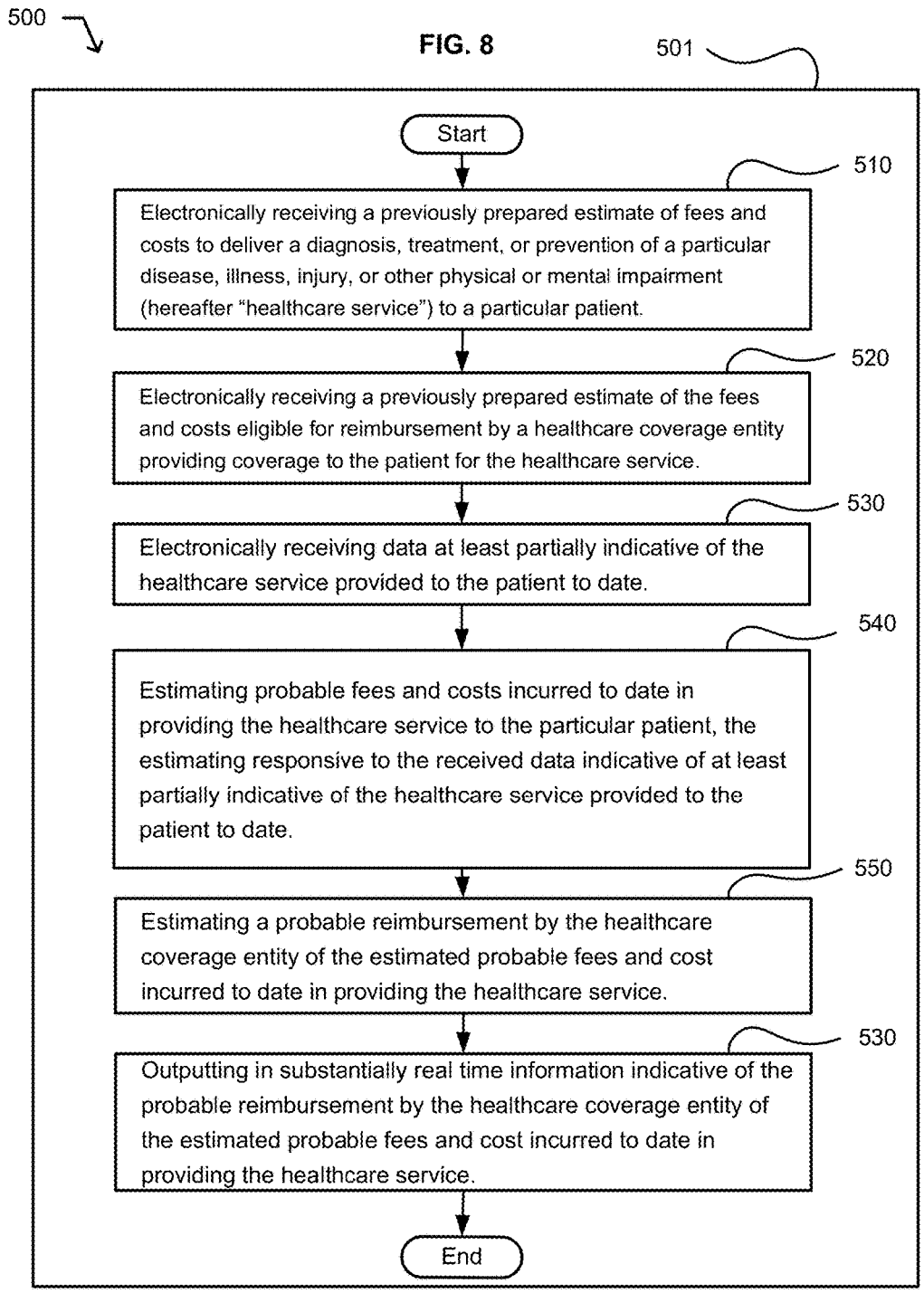

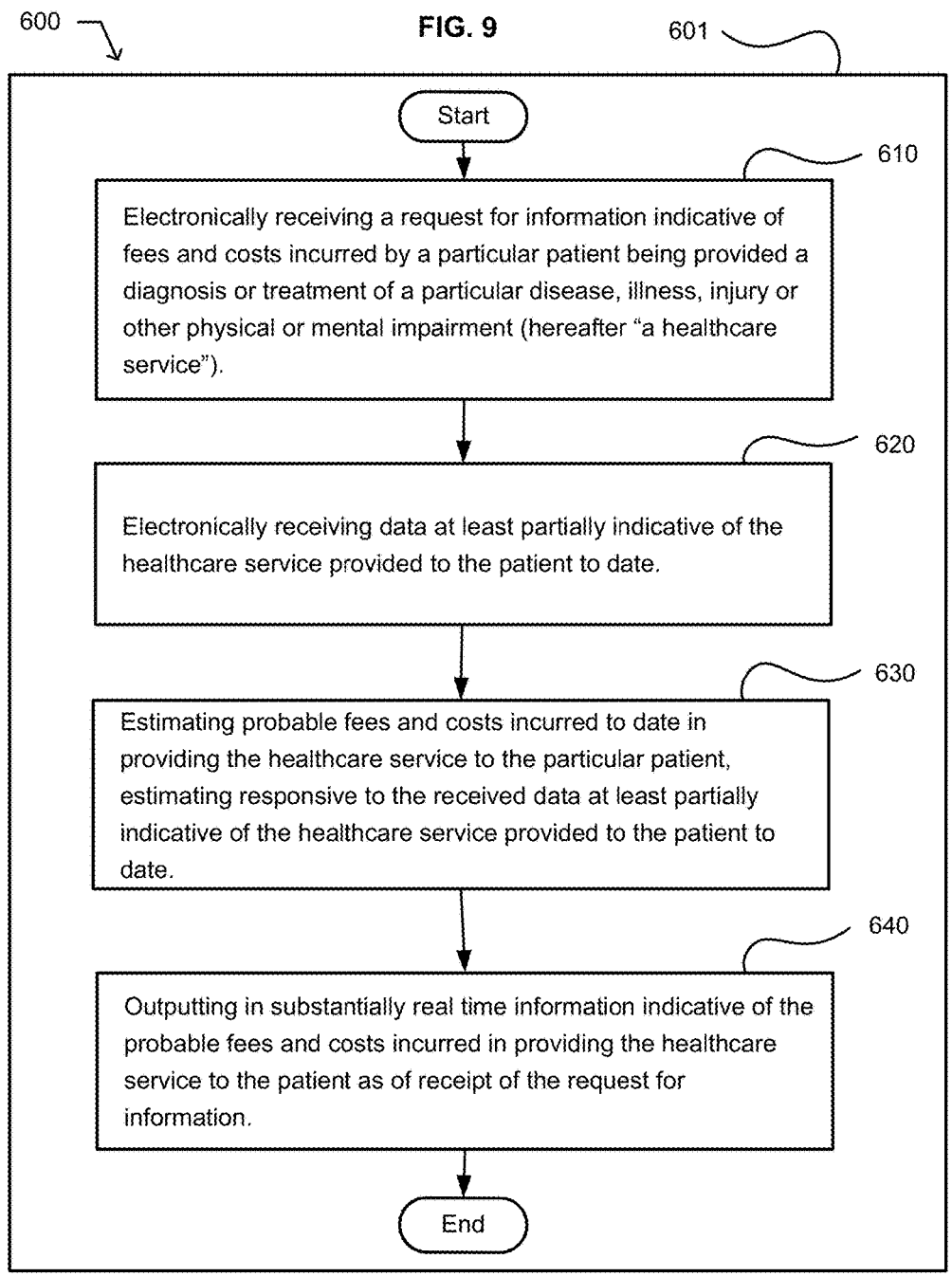

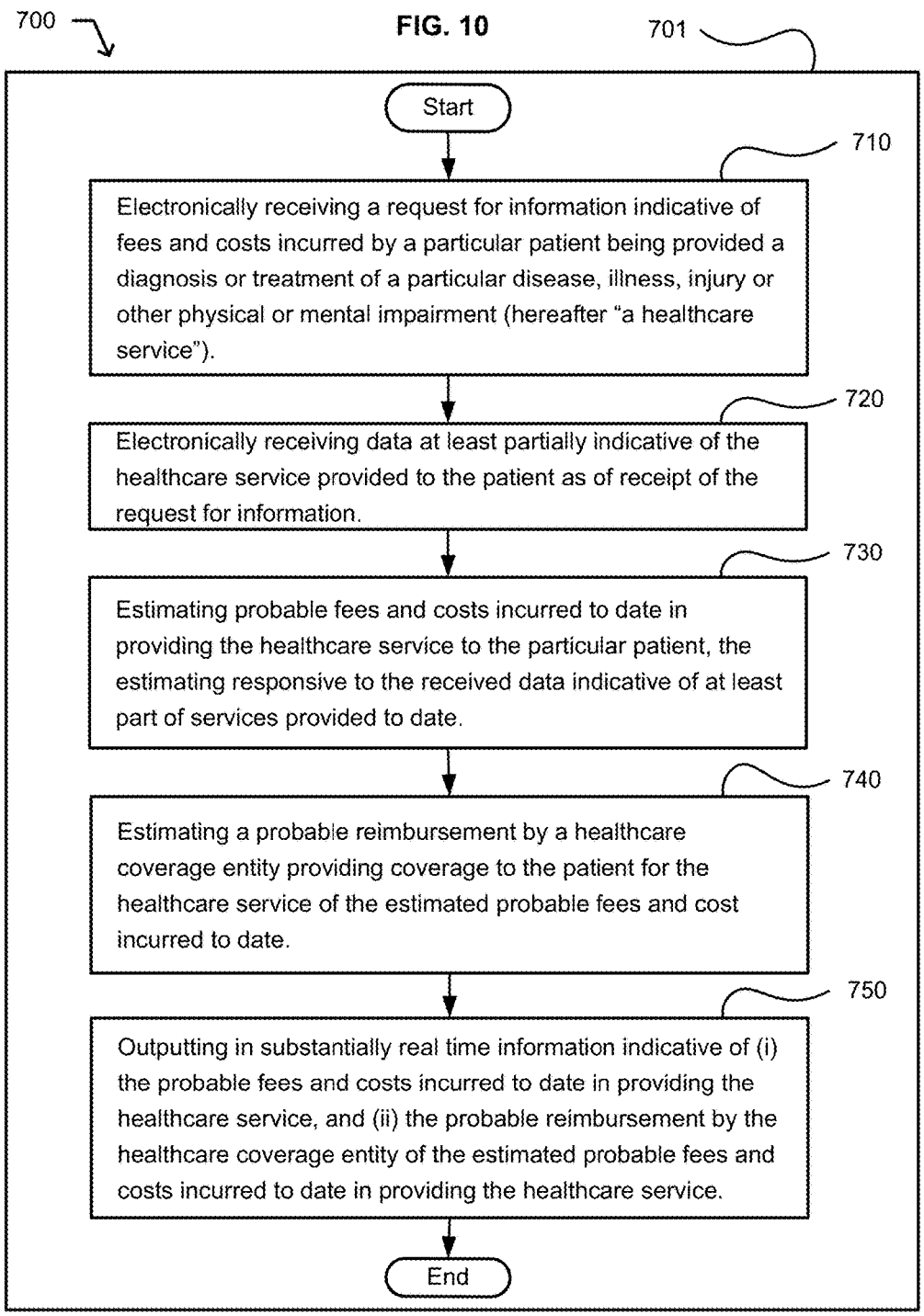

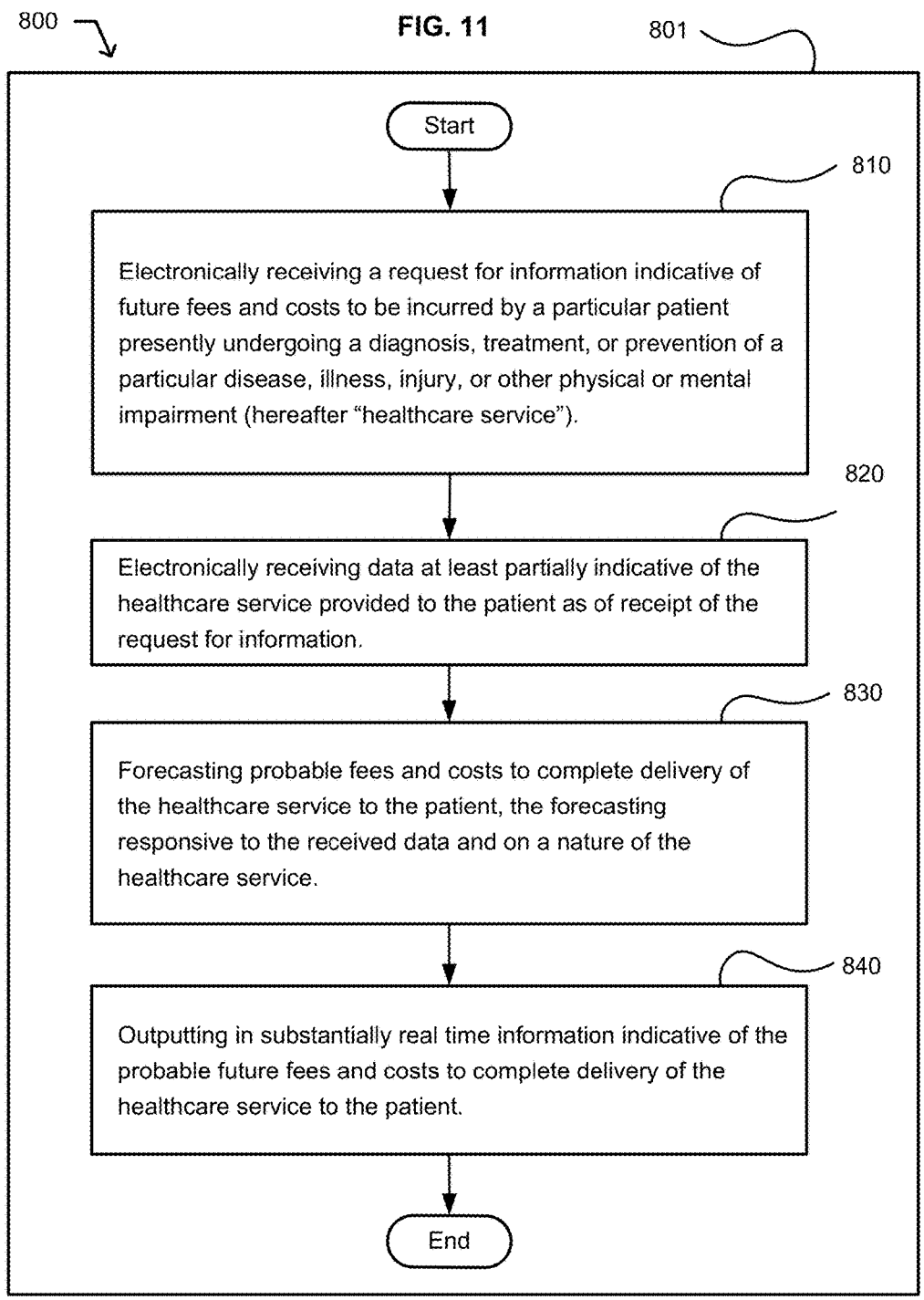

1110 Computer-readable media.

1120 Program instructions which, when executed by a processor of a computing device, cause the computing device to perform a process including:

(i) receiving a request for information indicative of (i) future fees and costs to be incurred by a particular patient presently undergoing a diagnosis, treatment, or prevention of a particular disease, illness, injury, or other physical or mental impairment (hereafter "healthcare service") and (ii) reimbursement of the future fees and costs by a healthcare coverage entity providing coverage to the patient for the healthcare service;

(ii) receiving data at least partially indicative of the healthcare service provided to the patient as of receipt of the request for information;

(iii) forecasting probable future fees and costs to complete delivery of the healthcare service to the patient, the forecasting responsive to the received data and a characteristic of the healthcare service;

(iv) forecasting a probable reimbursement by a healthcare coverage entity of the forecasted probable future fees and cost to complete delivery of the healthcare service to the patient; and (v) outputting information indicative of the probable fees and costs to complete delivery of the healthcare service, and the probable reimbursement by the healthcare coverage entity of the forecasted probable fees and cost to complete delivery of the healthcare service.

1112 The computer-readable media includes a tangible computer-readable media.

1114 The computer-readable media includes a communications media.

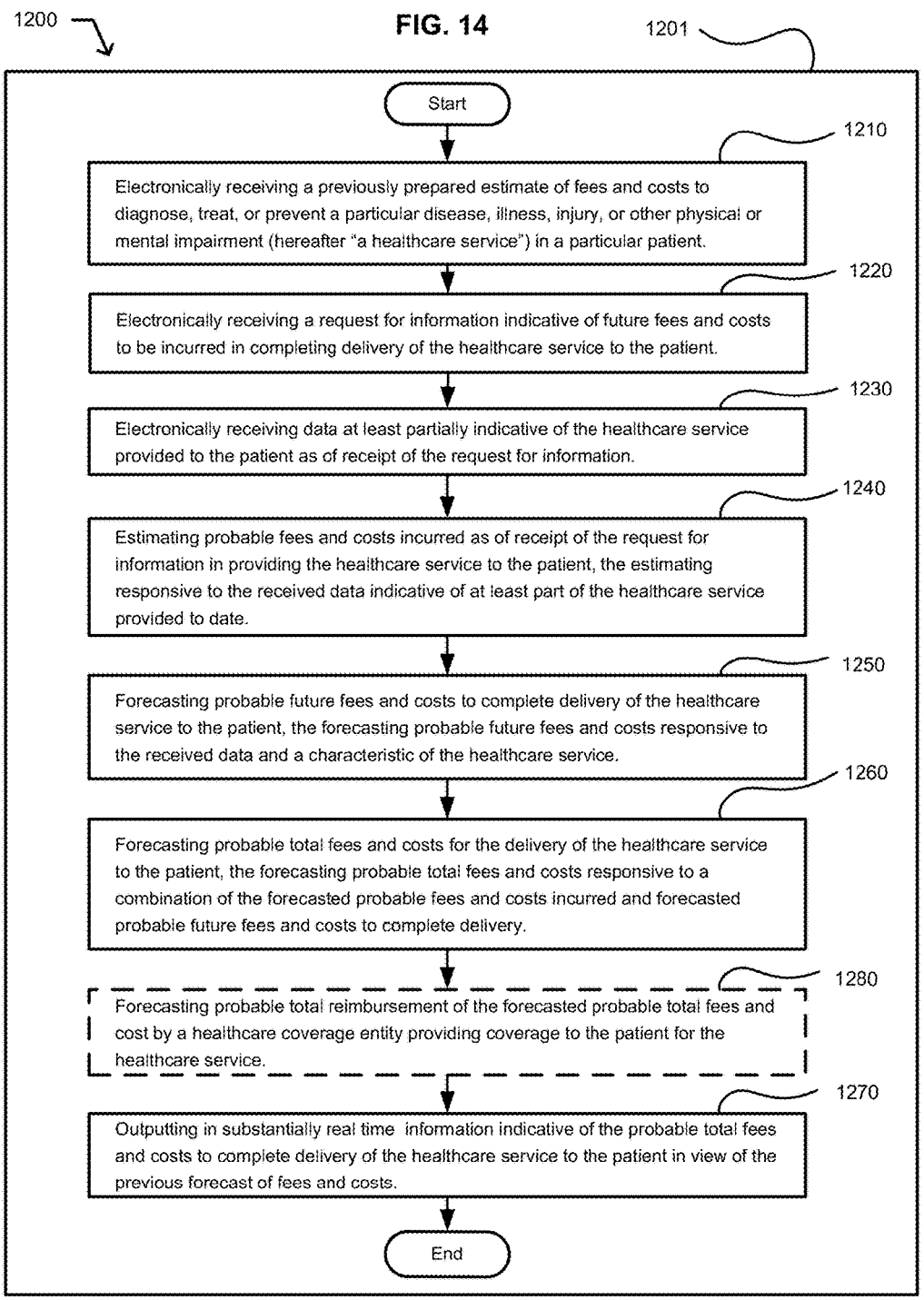

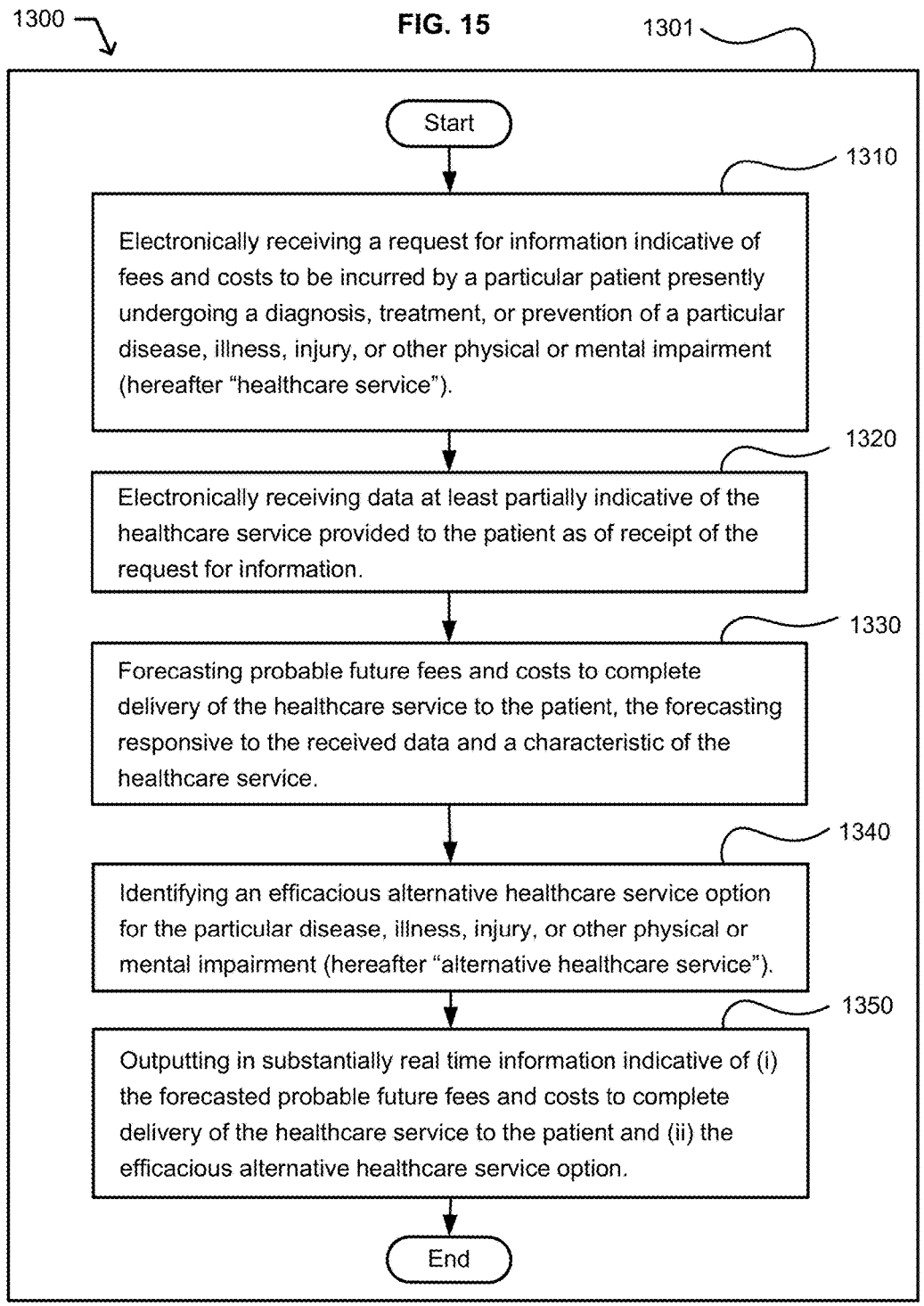

1410 Computer-readable media.

1420 Program instructions which, when executed by a processor of a computing device, cause the computing device to perform a process including:
(i) receiving a request for information indicative of future fees and costs to be incurred by a particular patient presently undergoing a diagnosis, treatment, or prevention of a particular disease, illness, injury, or other physical or mental impairment (hereafter "healthcare service");
(ii) receiving data at least partially indicative of the healthcare service provided to the patient as of receipt of the request for information;
(iii) forecasting probable future fees and costs to complete delivery of the healthcare service to the patient, the forecasting responsive to the received data and a characteristic of the healthcare service;
(iv) identifying an efficacious alternative healthcare service option for the particular disease, illness, injury, or other physical or mental impairment; and
(v) outputting information indicative of (a) the forecasted probable future fees and costs to complete delivery of the healthcare service to the patient and (b) the efficacious alternative healthcare service option.

1412 The computer-readable media includes a tangible computer-readable media.

1414 The computer-readable media includes a communications media.

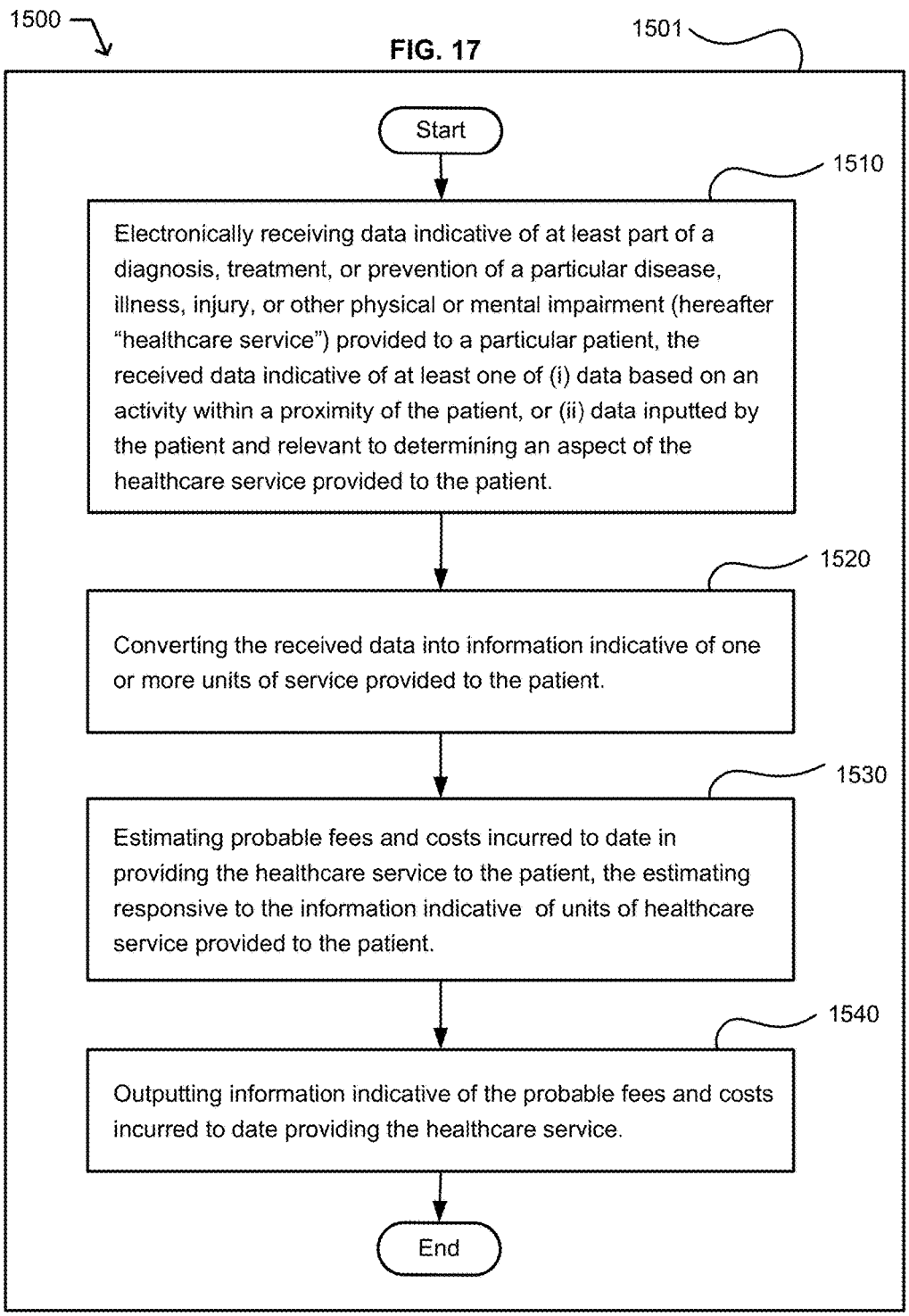

ESTIMATING FEES AND COSTS INCURRED BY A PATIENT RECEIVING A HEALTHCARE SERVICE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/728,843, entitled FORECASTING FEES AND COSTS TO COMPLETE DELIVERY OF A HEALTHCARE SERVICE TO A PATIENT, naming Roderick A. Hyde, Muriel Y. Ishikawa, Jordin T. Kare, Eric C. Leuthardt, Elizabeth A. Sweeney, and Lowell L. Wood, Jr. as inventors, filed 27, Dec. 2012, is related to the present application.

U.S. patent application Ser. No. 13/728,853, entitled INFORMATION INDICATING FEES AND COSTS TO COMPLETE DELIVERY OF A HEALTHCARE SERVICE TO A PATIENT AND AN ALTERNATIVE TO THE HEALTHCARE SERVICE, naming Roderick A. Hyde, Muriel Y. Ishikawa, Jordin T. Kare, Eric C. Leuthardt, Elizabeth A. Sweeney, and Lowell L. Wood, Jr. as inventors, filed 27, Dec. 2012, is related to the present application.

U.S. patent application Ser. No. 13/728,862, entitled ESTIMATING FEES AND COSTS INCURRED BY PATIENT BASED ON INDIRECTLY ACQUIRED DATA OR PATIENT ENTERED DATA, naming Roderick A. Hyde, Muriel Y. Ishikawa, Jordin T. Kare, Eric C. Leuthardt, Elizabeth A. Sweeney, and Lowell L. Wood, Jr. as inventors, filed 27, Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a computer-implemented method. The computer-implemented method includes electronically receiving a previously prepared estimate of fees and costs to deliver a diagnosis, treatment, or prevention of a particular disease, illness, injury, or other physical or mental impairment (hereafter "healthcare service") to a particular patient. The computer-implemented method includes electronically receiving data at least partially indicative of the healthcare service provided to the patient to date. The computer-implemented method includes estimating probable fees and costs incurred to date in providing the healthcare service to the particular patient. The estimating is responsive to the received data indicative of at least part of the healthcare service provided to date. The computer-implemented method includes outputting in substantially real time information indicative of the probable fees and costs incurred to date in view of the previous estimate of the fees and costs for providing the healthcare service.

In an embodiment, the computer-implemented method includes electronically receiving a request for information indicative of fees and costs incurred to date in providing the healthcare service to the particular patient. In an embodiment, the computer-implemented method includes storing data indicative of the outputted information in a computer-readable medium. In an embodiment, the computer-implemented method includes providing a notification of an availability of the outputted information to at least one of a human, computer, or system. In an embodiment, the computer-implemented method includes displaying a human-perceivable visual depiction of the information.

For example, and without limitation, an embodiment of the subject matter described herein includes a computing device. The computing device includes a computer storage media storing computer-executable instructions which, when executed by a processor of a computing device, cause the computing device to perform a process. The process includes receiving a previously prepared estimate of fees and costs to deliver a diagnosis, treatment, or prevention of a particular disease, illness, injury, or other physical or mental impairment (hereafter "healthcare service") to a particular patient. The process includes receiving data at least partially indicative of the healthcare service provided to the patient to date. The process includes estimating probable fees and costs incurred to date in providing the healthcare service to the particular patient. The estimating is responsive to the received data indicative of at least part of the healthcare service provided to date. The process includes outputting in substantially real time information indicative of the probable fees and costs incurred to date in view of the previous estimate of the fees and costs for providing the healthcare service. The computing device includes the processor configured to execute the computer-executable instructions. The computing device includes a communications circuit configured to receive and send data.

In an embodiment, the process further includes receiving a request for information indicative of fees and costs incurred to date in providing the healthcare service to the patient. In an embodiment, the computing device includes a display device configured to display the information indicative of the probable fees and costs incurred to date in view of the previous estimate of the fees and costs for providing the healthcare service.

For example, and without limitation, an embodiment of the subject matter described herein includes a computing device. The computing device includes a computer storage media storing computer-executable instructions. The computer-executable instructions which, when executed by a processor of a computing device, cause the computing device to perform a process. The process includes receiving a previously prepared estimate of fees and costs to deliver a diagnosis, treatment, or prevention of a particular disease, illness, injury, or other physical or mental impairment (hereafter "healthcare service") to a particular patient. The process includes receiving data at least partially indicative of the healthcare service provided to the patient to date. The process includes estimating probable fees and costs incurred to date in providing the healthcare service to the particular patient. The estimating is responsive to the received data indicative of at least part of the healthcare service provided to date. The process includes outputting in substantially real time information indicative of the probable fees and costs incurred to date in view of the previous estimate of the fees and costs for providing the healthcare service. The computing device includes the processor configured to execute the computer-executable instructions. The computing device includes a communications circuit configured to receive and send data. In an embodiment, the process further includes receiving a request for information indicative of fees and costs incurred to date in providing the healthcare service to the patient. In an embodiment, the computing device includes a display device configured to display the information indicative of the probable fees and costs incurred to date in view of the previous estimate of the fees and costs for providing the healthcare service.

For example, and without limitation, an embodiment of the subject matter described herein includes a computer program product. The computer program product includes computer-readable media bearing program instructions. The program instructions which, when executed by a processor of a computing device, cause the computing device to perform a process. The process includes receiving a previously prepared estimate of fees and costs to deliver a diagnosis, treatment, or prevention of a particular disease, illness, injury, or other physical or mental impairment (hereafter "healthcare service") to a particular patient. The process includes receiving data at least partially indicative of the healthcare service provided to the patient to date. The process includes estimating probable fees and costs incurred to date in providing the healthcare service to the particular patient. The estimating is responsive to the received data indicative of at least part of the healthcare service provided to date. The process includes outputting in substantially real time information indicative of the probable fees and costs incurred to date in view of the previous estimate of the fees and costs for providing the healthcare service. In an embodiment, the process further includes receiving a request for information indicative of fees and costs incurred to date in providing the healthcare service to the particular patient.

For example, and without limitation, an embodiment of the subject matter described herein includes a computer-implemented method. The computer-implemented method includes electronically receiving a previously prepared estimate of fees and costs to deliver a diagnosis, treatment, or prevention of a particular disease, illness, injury, or other physical or mental impairment (hereafter "healthcare service") to a particular patient. The computer-implemented method includes electronically receiving a previously prepared estimate of the fees and costs eligible for reimbursement by a healthcare coverage entity providing coverage to the patient for the healthcare service. The computer-implemented method includes electronically receiving data at least partially indicative of the healthcare service provided to the patient to date. The computer-implemented method includes estimating probable fees and costs incurred to date in providing the healthcare service to the particular patient. The estimating is responsive to the received data indicative of at least part of the healthcare service provided to date. The computer-implemented method includes estimating a probable reimbursement by the healthcare coverage entity of the estimated probable fees and cost incurred to date in providing the healthcare service. The computer-implemented method includes outputting in substantially real time information indicative of the probable reimbursement by the healthcare coverage entity of the estimated probable fees and cost incurred to date in providing the healthcare service. In an embodiment, the computer-implemented method includes electronically receiving a request for information indicative of fees and costs incurred to date in providing the healthcare service to the particular patient.

For example, and without limitation, an embodiment of the subject matter described herein includes a computer program product. The computer program product includes computer-readable media bearing program instructions. The program instructions which, when executed by a processor of a computing device, cause the computing device to perform a process. The process includes receiving a request for information indicative of fees and costs incurred by a particular patient being provided a diagnosis or treatment of a particular disease, illness, injury or other physical or mental impairment (hereafter "healthcare service"). The process includes receiving data at least partially indicative of the healthcare service provided to the patient to date. The process includes estimating probable fees and costs incurred to date in providing the healthcare service to the particular patient. The estimating is responsive to the received data indicative of at least part of the services provided to date. The process includes outputting in substantially real time information indicative of the probable fees and costs incurred in providing the healthcare service to the patient as of receipt of the request for information.

For example, and without limitation, an embodiment of the subject matter described herein includes a computer-implemented method. The computer-implemented method includes electronically receiving a request for information indicative of fees and costs incurred by a particular patient being provided a diagnosis or treatment of a particular disease, illness, injury or other physical or mental impairment (hereafter "healthcare service"). The computer-implemented method includes electronically receiving data at least partially indicative of the healthcare service provided to the patient as of receipt of the request for information. The computer-implemented method includes estimating probable fees and costs incurred to date in providing the healthcare service to the particular patient. The estimating is responsive to the received data indicative of at least part of the services provided to date. The computer-implemented method includes estimating a probable reimbursement by a healthcare coverage entity providing coverage to the patient for the healthcare service of the estimated probable fees and cost incurred to date. The computer-implemented method includes outputting in substantially real time information indicative of (i) the probable fees and costs incurred to date in providing the healthcare service, and (ii) the probable reimbursement by the healthcare coverage entity of the estimated probable fees and costs incurred to date in providing the healthcare service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 illustrates an environment 300 in which embodiments may be implemented;

FIG. 7 illustrates an example computer program product 400;

FIG. 8 illustrates an example operational flow 500 implemented in a computing device 501;

FIG. 9 illustrates an example operational flow 600 implemented in a computing device 601;

FIG. 10 illustrates an example operational flow 700 implemented in a computing device 701;

FIG. 11 illustrates an example operational flow 800 implemented in a computing device 801;

FIG. 13 illustrates an example computer program product 1100;

FIG. 14 illustrates an example operational flow 1200 implemented in a computing device 1201;

FIG. 15 illustrates an example operational flow 1300 implemented in a computing device 1301;

FIG. 16 illustrates an example computer program product 1400;

FIG. 17 illustrates an example operational flow 1500 implemented in a computing device 1501.

DETAILED DESCRIPTION

Figure 1:
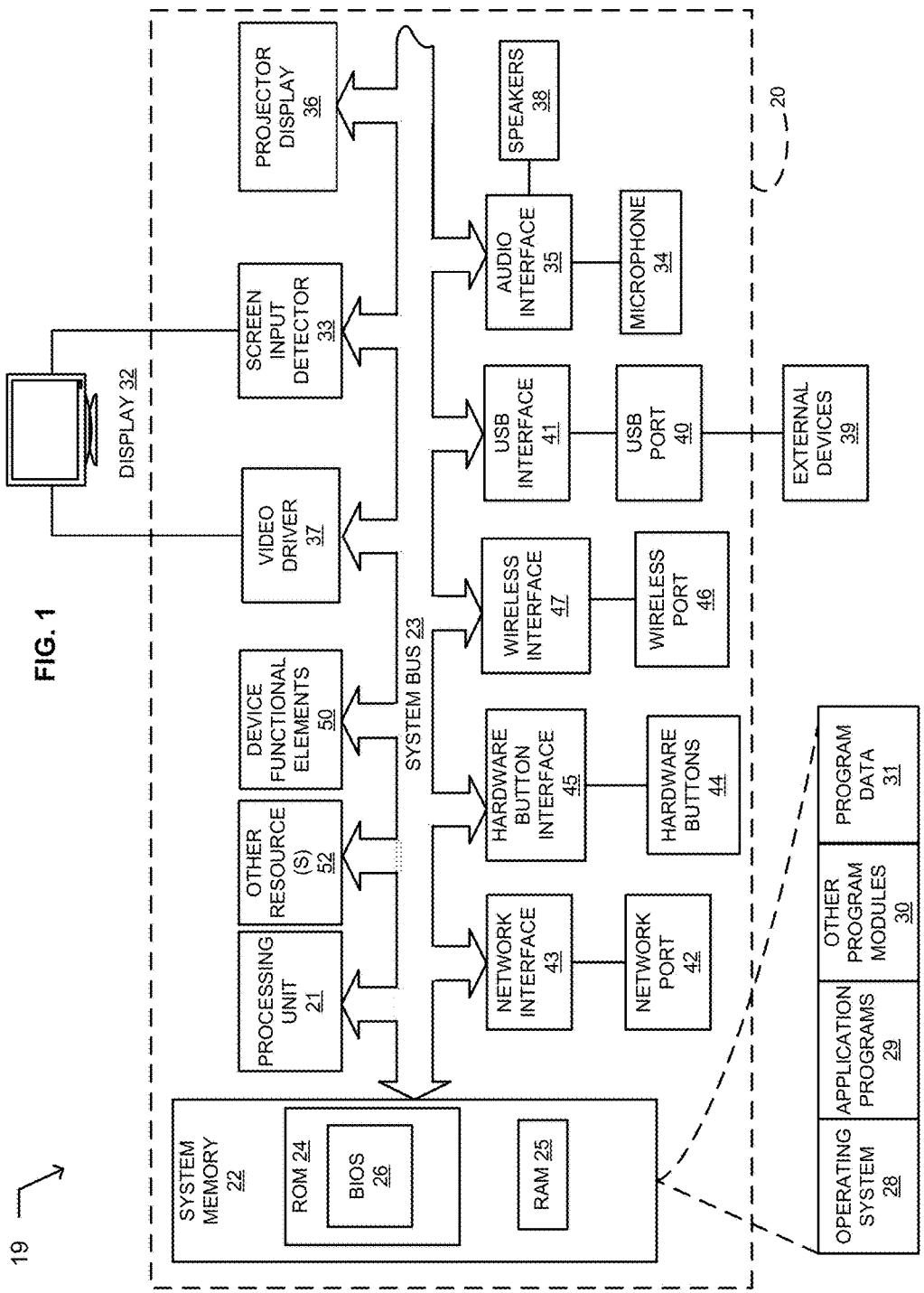
FIG. 1 illustrates an example embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
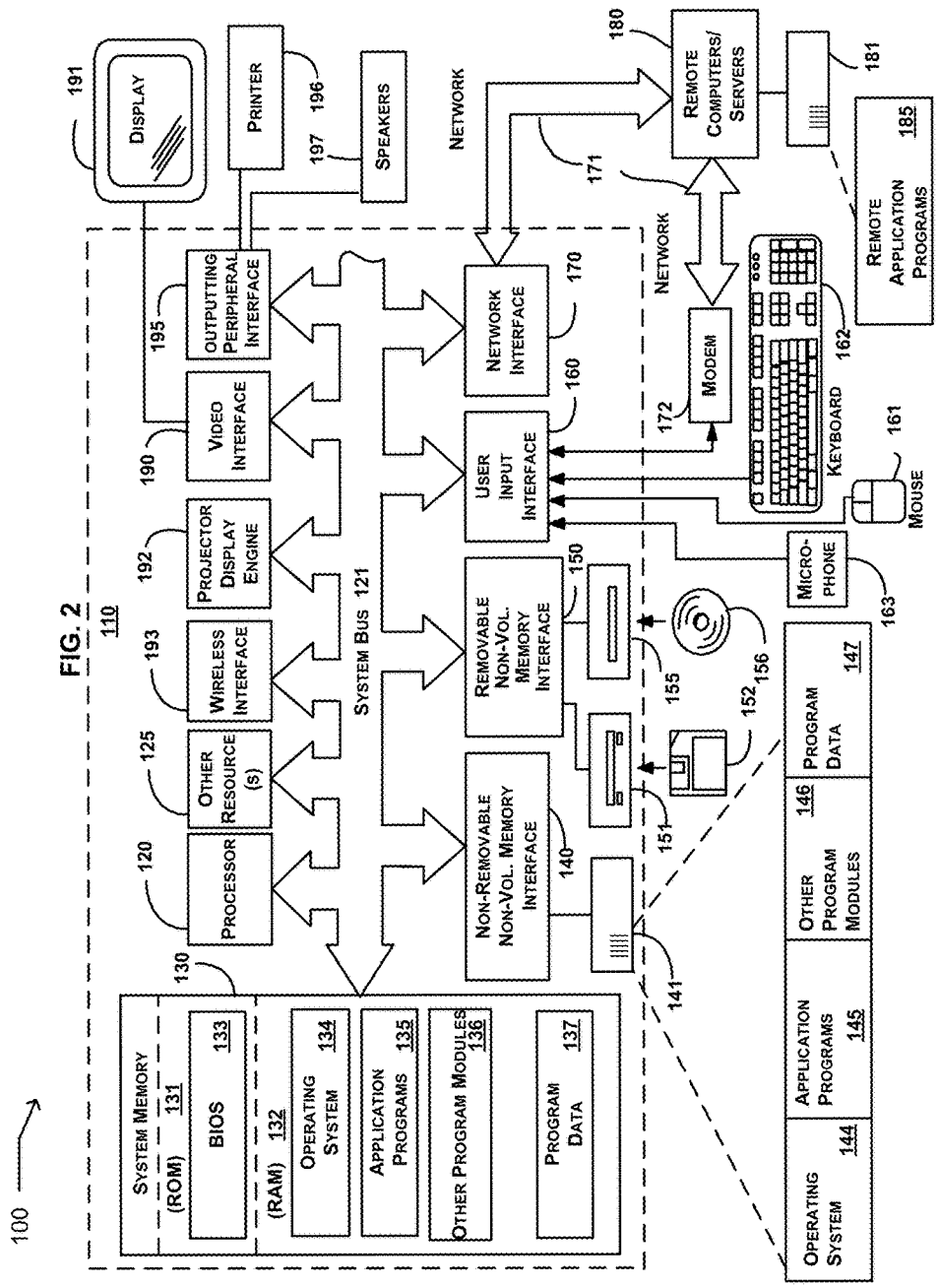
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing communication link between the computers may be used.

In certain instances, one or more elements of the computing device 110 may be deemed not necessary and omitted. In other instances, one or more other elements may be deemed necessary and added to the computing device.

Figure 3:
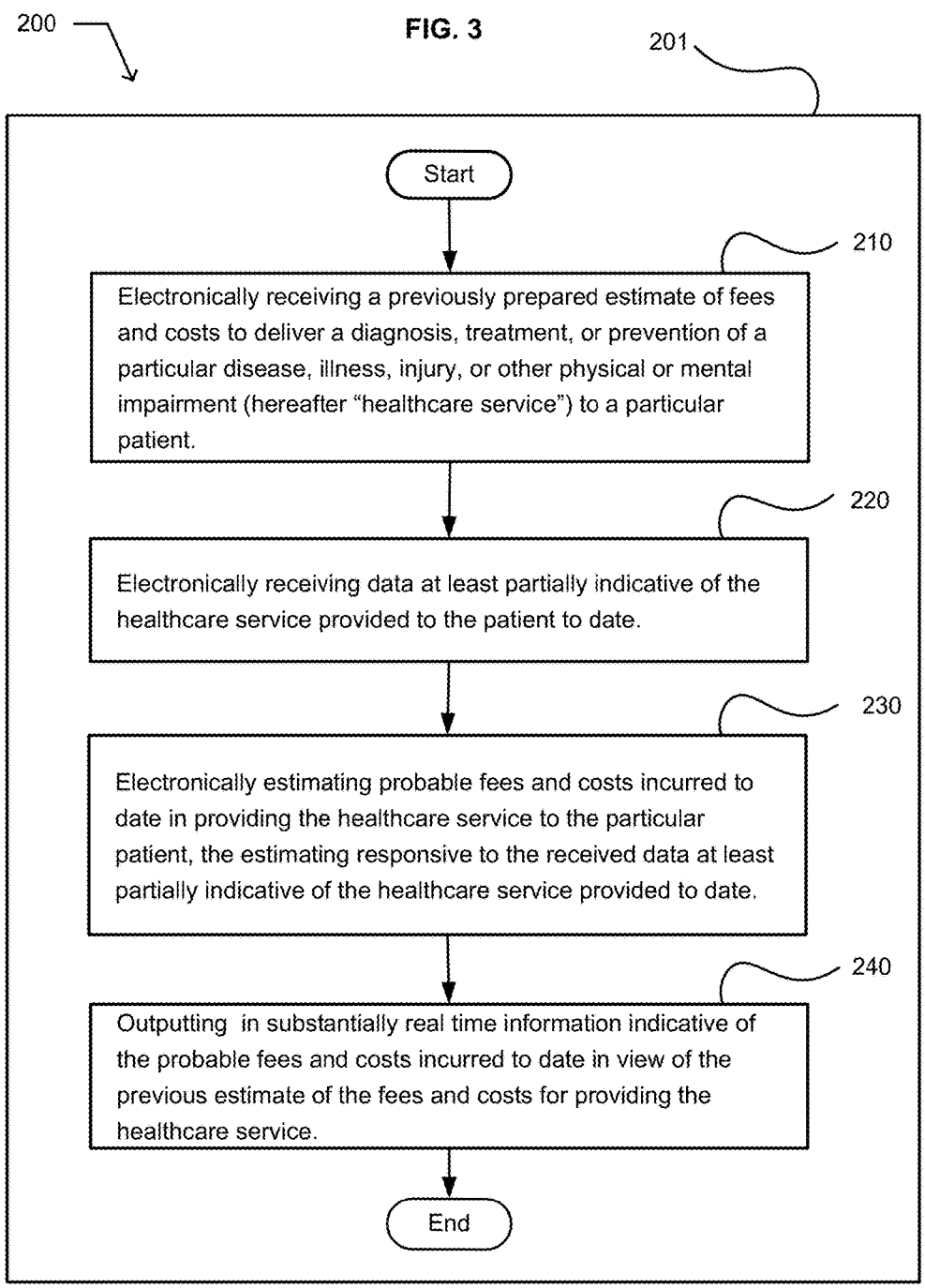
FIG. 3 illustrates an example environment 200 in which embodiments may be implemented.

FIG. 3 illustrates an example operational flow 200 implemented in a computing device 201. In an embodiment, the operational flow may be implemented using the computing device 20 of the environment 19 described in conjunction with FIG. 1. In an embodiment, the operational flow may be implemented using the computing device 110 of the general purpose computing environment 100 described in conjunction with FIG. 2. In an embodiment, the operational flow may be implemented using the computing device 302 of the environment 300 described in conjunction with FIG. 6 below.

After a start operation, the operational flow 200 includes an estimate-reception operation 210. The estimate-reception operation includes electronically receiving a previously prepared estimate of fees and costs to deliver a diagnosis, treatment, or prevention of a particular disease, illness, injury, or other physical or mental impairment (hereafter "healthcare service") to a particular patient. For example, U.S. Pat. App. 20060080139, published Apr. 13, 2006, R. Mainzer, describes a method for estimating treatment costs for a patient prior to admission. Further, Mainzer describes a method for estimating reimbursement by Medicare and by managed care organizations. For example, U.S. Pat. App. 20070271119, published Nov. 22, 2007, G. Boerger, et al. describes preparing an estimate of a cost expected to be borne by a patient incurring medical service. For example, the estimate-reception operation may be implemented using the communication device(s) 360 of the computing device 302 described in conjunction with FIG. 6 below. A service-provided reception operation 220 includes electronically receiving data at least partially indicative of the healthcare service provided to the patient to date. In an embodiment, the data includes data partially indicative of the healthcare service provided to the patient to date. For example, in an embodiment, the many players involved in providing or delivering the healthcare service may report or bill for their component of the healthcare service at different times. Thus, at any given time during a provision or delivery of the healthcare service, complete data indicative of the healthcare service provided to the patient as of receipt of the request for information may not be unavailable. For example, the service-provided reception operation may also be implemented using the communication device(s) 360 of the computing device 302 described in conjunction with FIG. 6 below.

An evaluation operation 230 includes electronically estimating probable fees and costs incurred to date in providing the healthcare service to the particular patient. The estimating is responsive to the received data at least partially indicative of the healthcare service provided to date. For example, the evaluation operation may be responsive to a data base of historical fee and cost information for the healthcare service. The data indicative of historical fee and cost information may have been gathered by a healthcare coverage entity, a hospital, a private entity, or a governmental entity. For example, the website Healthcare Blue Book, www.healthcarebluebook.com, provides estimates of fair prices for a variety of healthcare services (accessed Dec. 11, 2012). In an embodiment, the evaluation operation takes into consideration that the received data is partially indicative of the healthcare service provided to date. For example, the evaluation operation may be implemented by the processing unit 320 applying an evaluation algorithm saved in a storage, such as the removable storage 332, and loaded in the system memory 310 of the computing device 302 described in conjunction with FIG. 6 below. A communication operation 240 includes outputting information indicative of the probable fees and costs incurred to date in view of the previous estimate of the fees and costs for providing the healthcare service. For example, the communication operation may be implemented using a display 370 illustrated in conjunction with FIG. 6 below. For example, the communication operation may include outputting the information to another device coupled with the network 380. The operational flow includes an end operation.

In an embodiment of the estimate-reception operation 210, the previous estimate of fees and costs includes a previous estimate of fees and costs prepared before delivery initiation of the particular healthcare service. In an embodiment, the previous estimate of fees and costs includes a previous estimate of fees and costs prepared at a point during a course delivery of the particular healthcare service. In an embodiment, the previous estimate of fees and costs includes a previous estimate of physician, healthcare worker, hospital, facility, equipment, procedure, drug, or supply fees and costs to deliver a particular healthcare service to a particular patient. In an embodiment, the fees and costs includes fees and costs to deliver a particular treatment, surgery, hospitalization, or rehabilitation healthcare service to a particular patient.

Figure 4:
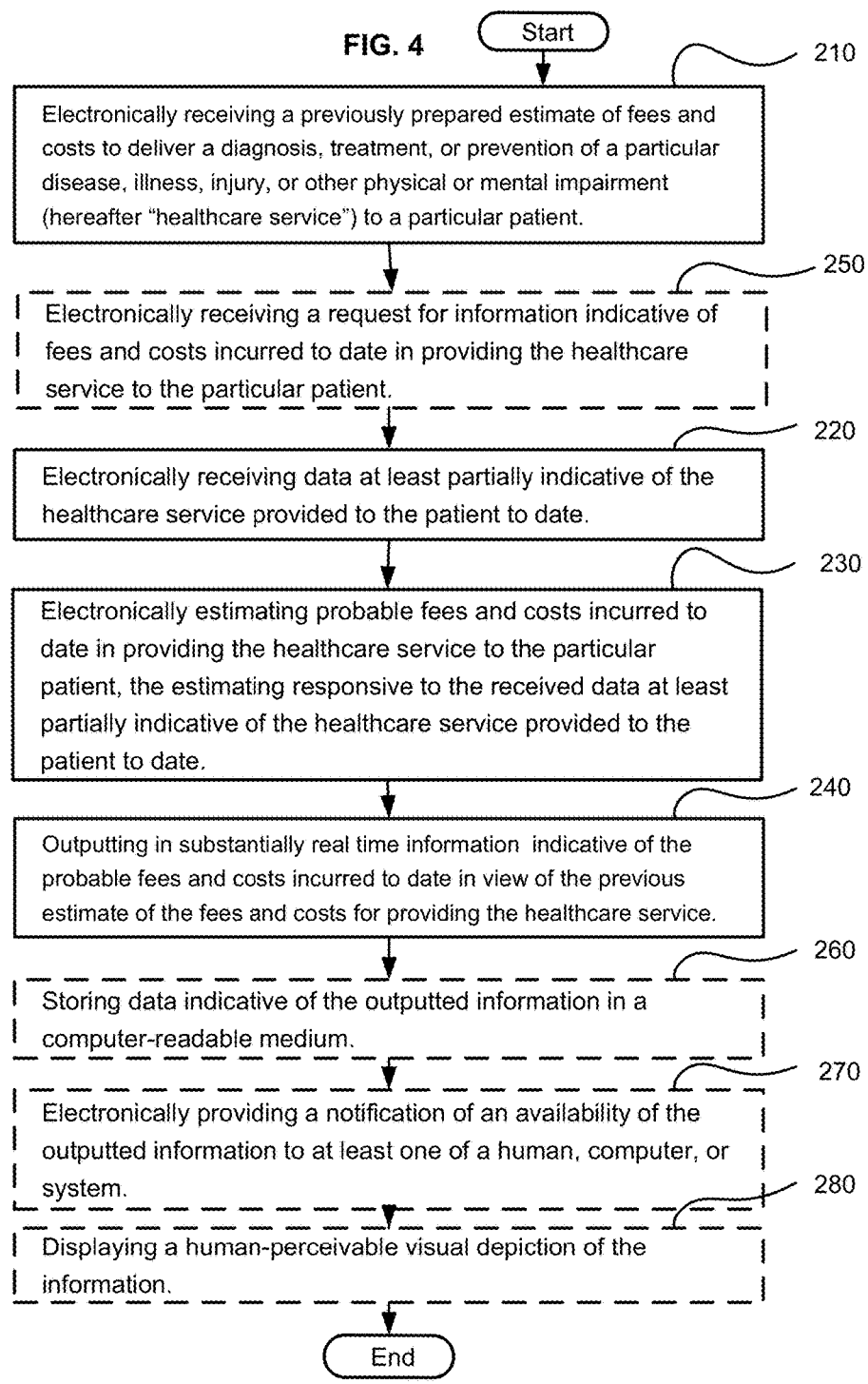
FIG. 4 illustrates an alternative embodiment of the operational flow 200.

FIG. 4 illustrates an alternative embodiment of the operational flow 200. For example, the operational flow may include an operation 250. The operation 250 includes electronically receiving a request for information indicative of fees and costs incurred to date in providing the healthcare service to the particular patient. In an embodiment, the electronically receiving a request for information includes electronically receiving a patient-initiated request for information.

In an embodiment of the operation 250, the electronically receiving a request for information includes electronically receiving a healthcare coverage entity initiated request for information. In an embodiment, the electronically receiving a request for information includes electronically receiving a healthcare provider initiated request for information. In an embodiment, the electronically receiving a request for information further includes electronically receiving a request for information indicative of a forecast of future fees and costs to be incurred in providing the healthcare service. In an embodiment, the electronically receiving a request for information further includes electronically receiving a request for information indicative of at least one efficacious healthcare service option for the particular disease, illness, injury, or other physical or mental impairment. In an embodiment, the electronically receiving a request for information further includes electronically receiving a request for information indicative of fees and costs incurred before or as of the time and date of the request. In an embodiment, the electronically receiving a request for information further includes electronically receiving a request for information indicative of fees and costs incurred to date in providing the healthcare service to the particular patient in view of the previously prepared estimate of fees and costs.

Returning to FIG. 3, in an embodiment of the service-provided reception operation 220, the electronically receiving data includes electronically receiving a medical code for a healthcare charge. In an embodiment, the medical code for a healthcare charge indicates at least one of a physician, health worker, hospital, facility, equipment, operating room, procedure, imaging, lab request, or report activity relevant to the healthcare service. In an embodiment, the electronically receiving data includes electronically receiving data indicative of a healthcare event that occurred in providing the healthcare service. In an embodiment, a healthcare event includes at least one of a physician, health worker, hospital, facility, equipment, operating room, procedure, imaging, radiology, lab request, or report relevant to the healthcare service provided to the patient to date. For example, a healthcare event may include usages without codes, or any kind of data suitable for mining for a hospital, provider, laboratory, or other activity. In an embodiment, the electronically receiving data includes electronically receiving data contained in or reflected in an electronic health record or an electronic medical record partially indicative of the healthcare service provided to the patient to date. In an embodiment, the electronically receiving data includes electronically receiving data contained in or reflected in one or more electronic billing records partially indicative of the healthcare service provided to the patient to date. In an embodiment, the electronically receiving data includes electronically receiving data inputted by the patient and indicative of at least a part of the healthcare service provided to the patient to date. In an embodiment, the data inputted by the patient may include data inputted by a patient representative. For example, the patient representative may include a family member, guardian, parent, spouse, caretaker, or delegate. For example, in an instance where the patient is unconscious or not fully aware of what is occurring, the patient representative may input the data indicative of at least a part of the healthcare service provided to the patient to date. For example, the data inputted by the patient may be used by a healthcare coverage entity to supplement information inputted by the healthcare provider. For example, the data inputted by the patient may be used to update, supplement, clarify, or modify information inputted related to an activity by a physician, health worker, hospital, facility, equipment, operating room, imaging, or laboratory. For example, the data inputted by the patient may be used to independently verify information inputted on behalf of a physician, health worker, hospital, facility, equipment, operating room, imaging, or laboratory.

In an embodiment of the evaluation operation 230, the estimating includes forecasting, implying, or inferring probable fees and costs incurred at least partially based upon received data indicative of at least part of the healthcare services provided to date. For example, the estimating may be responsive to codes, responsive to other activity, or inferred or implied by the received data. For example, a surgery procedure charge implies or infers charges for operating room, and anesthetist charges. In an embodiment, the estimating includes further estimating probable fees and costs incurred at least partially based upon rule sets or algorithms. For example, the estimating may be implemented on or managed by a computing device controlled by a healthcare coverage entity or by a patient controlled device, such as a cell phone, laptop, or tablet device. In an embodiment, the estimating probable fees and costs incurred to date is further responsive to an efficiency rating, history, experience, or outcomes of a healthcare facility providing the healthcare service. In an embodiment, the estimating probable fees and costs incurred to date is further responsive to an efficiency rating, history, experience, or outcomes of a physician attending the patient.

In an embodiment of the evaluation operation 230, the estimating includes estimating with a prediction interval probable fees and costs incurred to date in providing the healthcare service to the particular patient. In an embodiment, a prediction interval includes a range of most likely outcomes that a forecast or estimate provides. In an embodiment, a prediction interval is an estimate of an interval in which future observations will fall, with a certain probability, given what has already been observed. In an embodiment, the prediction interval includes a preselected prediction interval. In an embodiment, the prediction interval is biased towards overestimating the probable fees and costs incurred to date in providing the healthcare service to the particular patient. In an embodiment, the prediction interval is biased towards underestimating the probable fees and costs incurred to date in providing the healthcare service to the particular patient. In an embodiment, the prediction interval includes a probability that fees and costs incurred to date will be less than a given value.

Figure 5:
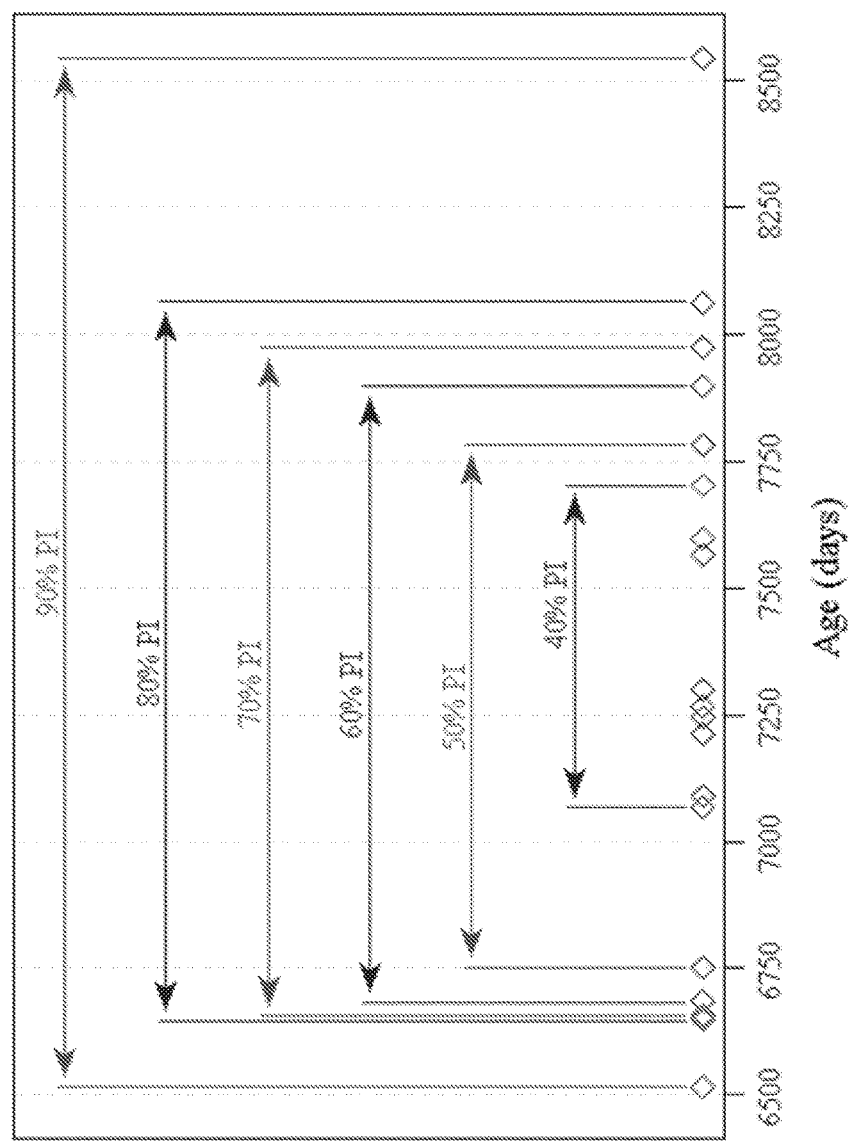
FIG. 5 illustrates an example of several prediction intervals.

In an embodiment of the evaluation operation 230, the prediction interval is narrower than 50%. In an embodiment, the prediction interval is narrower than 60%. In an embodiment, the prediction interval is narrower than 70%. In an embodiment, the prediction interval is narrower than 80%. In an embodiment, the prediction interval is 90% or narrower. FIG. 5 illustrates an example of several prediction intervals. While the substance of the data on which these prediction intervals were prepared is not relevant, FIG. 5 illustrates the concept of several prediction levels for a subsequent event given 19 events that have already occurred. For example, FIG. 5 illustrates that a prediction interval of 40% or 45% is narrower than a prediction interval of 50%. For example, in an embodiment, with a prediction interval of 80%, a future observation will fall within the interval 80% of the time. For example, in an embodiment, with a prediction interval of 40%, a future observation will fall within the interval 40% of the time.

In an embodiment of the evaluation operation 230, the prediction interval is based at least in part on an accuracy of prior predictions of fees and costs incurred in providing the healthcare service to at least ten other patients. In an embodiment of the evaluation operation, the prediction interval is based at least in part on accuracy of prior predictions of fees and costs incurred in providing general healthcare services to at least ten other patients by the same healthcare facility providing the particular healthcare to the particular patient. In an embodiment, the prediction interval includes a likelihood that the probable fees and costs incurred to date will be above or below a certain a threshold.

In an embodiment of the communication operation 240, the outputting information includes outputting the information in substantially real time. In an embodiment, the outputting information includes outputting the information in substantially real time after electronically receiving a request for information. In an embodiment, the outputting information includes outputting the information within 60 minutes of the receiving a request for information. In an embodiment, the outputting information includes outputting the information within 30 minutes of the receiving a request for information. In an embodiment, the outputting information includes outputting the information within 15 minutes of the receiving a request for information. In an embodiment, the outputting information includes outputting the information within 5 minutes of the receiving a request for information. In an embodiment, the outputting information includes outputting the information within 2 minutes of the receiving a request for information. In an embodiment, the outputting information includes outputting the information within 30 seconds of the receiving a request for information. In an embodiment, the outputting information includes outputting the information within 15 seconds of the receiving a request for information. In an embodiment, the outputting information includes outputting the information within 5 seconds of the receiving a request for information.

In an embodiment of the communication operation 240, the outputting information includes transforming into a particular visual depiction the information indicative of the probable fees and costs incurred to date in view of the previous estimate of the fees and costs for providing the healthcare service, and outputting the particular visual depiction. In an embodiment, the outputting information includes transforming into a particular audio description the information indicative of the probable fees and costs incurred to date in view of the previous estimate of the fees and costs for providing the healthcare service, and outputting the particular audio description. In an embodiment, the outputting information further includes outputting information indicative of at least two efficacious healthcare service options for the particular disease, illness, injury, or other physical or mental impairment. In an embodiment, the outputting information includes outputting information indicative of at least two efficacious alternative healthcare service options, and a likely treatment scenario for each of the at least two efficacious alternative healthcare service options. In an embodiment, the likely treatment scenarios for each of the at least two efficacious alternative healthcare service options include forecasted probable fees and costs as a function of inpatient days in a healthcare facility. In an embodiment, the outputting information includes outputting information indicative of at least two efficacious alternative healthcare service options, and forecasted probable fees and costs associated with each of the at least two efficacious alternative healthcare service options. In an embodiment, the outputting information includes outputting the information in a format usable in displaying a human-perceivable indication of the information. In an embodiment, the outputting information includes outputting a data file to a device used or usable by the patient. In an embodiment, the outputting information further includes outputting information indicative of who prepared the estimated probable fees and costs. In an embodiment, the outputting information further includes outputting information indicative of when the estimated probable fees and costs were prepared.

In an embodiment, the outputting information includes outputting a signal useable in displaying a human-perceivable visual depiction of the information indicative of the probable fees and costs incurred to date in view of the previous estimate of the fees and costs for providing the healthcare service.

Returning to FIG. 4, this figure also illustrates additional alternative embodiments of the operational flow 200. For example, the additional alternative embodiments may include an operation 260, an operation 270, or an operation 280. The operation 260 includes storing data indicative of the outputted information in a computer-readable medium. The operation 270 includes electronically providing a notification of an availability of the outputted information to at least one of a human, computer, or system. The operation 280 includes displaying a human-perceivable visual depiction of the information. In an alternative embodiment, the displaying includes displaying the human-perceivable visual depiction of the information indicative of the probable fees and costs incurred to date in view of the previous estimate of the fees and costs for providing the healthcare service.

FIG. 6 illustrates an environment 300 in which embodiments may be implemented. The environment includes a computing device 302, a patient 395, and at least one device that may communicate with the computing device over a network 380. For example, the at least one device may include a laptop computing device 382, a tablet device 383, a server 384, a desktop device 385, or a cellular smart phone device 386. For example, the network may include local network or a wide area network, such the Internet. For example, the computing device may be owned or operated by a hospital, a healthcare coverage entity, a physician, a physician billing service, or the patient. In an embodiment, the computing device 302 may be implemented using the computing device 20 of the environment 19 described in conjunction with FIG. 1. In an embodiment, the computing device 302 may be implemented using the computing device 110 of the general purpose computing environment 100 described in conjunction with FIG. 2.

The computing device 302 includes a processor configured to execute computer-executable instructions. The processor is illustrated by a processing unit 320. In an embodiment, the processing unit may be substantially similar to the processing unit 21 described in conjunction with FIG. 1, or the processor 120 described in conjunction with FIG. 2. The computing device includes a communications circuit(s) 360 configured to receive and send data. The computing device includes computer storage media. In an embodiment, the computer storage media includes a removable storage 332. In an embodiment, the computer storage media includes a non-removable storage 334. In an embodiment, the computer storage media includes a system memory 310. The computing device 302 includes a display 370. In an embodiment, the display may be substantially similar to the display 32 described in conjunction with FIG. 1, or the display 191 described in conjunction with FIG. 2.

The computing device 302 includes the computer storage media storing computer-executable instructions. The computer-executable instructions when executed by a processor of a computing device cause the computing device to perform a process. The process includes receiving a previously prepared estimate of fees and costs to deliver a diagnosis, treatment, or prevention of a particular disease, illness, injury, or other physical or mental impairment (hereafter "healthcare service") to a particular patient. For example, the particular patient is illustrated by the patient 395. The process includes receiving data at least partially indicative of the healthcare service provided to the patient to date. In an embodiment, the receiving data includes receiving data partially indicative of the healthcare service provided to the patient to date. The process includes estimating probable fees and costs incurred to date in providing the healthcare service to the particular patient. The estimating is responsive to the received data at least partially indicative of the healthcare service provided to the patient to date. The process includes outputting information indicative of the probable fees and costs incurred to date in view of the previous estimate of the fees and costs for providing the healthcare service. For example, the information may be displayed by the display 370, or may be outputted as a signal via the communication(s) device 360.

The computing device 302 includes output device(s) 340. For example, the output devices may include the output devices described in conjunction with FIG. 1 or 2. The computing device includes input device(s) 350. For example, the output devices may include the input devices described in conjunction with FIG. 1 or 2. The computing device includes a volatile system memory 312 and non-volatile system memory 314. In an alternative embodiment, the processor is programmed by the computer-executable instructions. In an embodiment, the computer executable instructions are loaded into the volatile memory 312 of the system memory 310 from the computer storage media. In an alternative embodiment, the process includes receiving a request for information indicative of fees and costs incurred to date in providing the healthcare service to the patient. For example, the request for information may be initiated by a hospital, a healthcare coverage entity, a physician, a physician billing service, the patient, a patient delegate, or a potentially financially responsible person or party. For example, the request for information may be initiated using one or more of the devices 382-386.

FIG. 7 illustrates an example computer program product 400. The computer program product includes a computer-readable media 410 bearing program instructions 420. The program instructions which, when executed by a processor of a computing device, cause the computing device to perform a process. The process includes receiving a previously prepared estimate of fees and costs to deliver a diagnosis, treatment, or prevention of a particular disease, illness, injury, or other physical or mental impairment (hereafter "healthcare service") to a particular patient. The process includes receiving data at least partially indicative of the healthcare service provided to the patient to date. In an embodiment, the receiving data includes receiving data partially indicative of the healthcare service provided to the patient to date. The process includes estimating probable fees and costs incurred to date in providing the healthcare service to the particular patient. The estimating is responsive to the received data indicative of at least part of the healthcare service provided to date. The process includes outputting information indicative of the probable fees and costs incurred to date in view of the previous estimate of the fees and costs for providing the healthcare service.

In an embodiment, the process of the program instructions 420 includes receiving 422 a request for information indicative of fees and costs incurred to date in providing the healthcare service to the particular patient. In an embodiment, the computer-readable media 410 includes a computer storage media 412. In an embodiment, the computer-readable medium includes a communication media 414.

FIG. 8 illustrates an example operational flow 500 implemented in a computing device 501. For example, the computing device may be substantially similar to the computing device 302 described in conjunction with FIG. 6. After a start operation, the operational flow includes an estimate-reception operation 510. The estimate-reception operation includes electronically receiving a previously prepared estimate of fees and costs to deliver a diagnosis, treatment, or prevention of a particular disease, illness, injury, or other physical or mental impairment (hereafter "healthcare service") to a particular patient. In an embodiment, the estimate-reception operation may be implemented using the communication device(s) 360 described in conjunction with FIG. 6. A coverage reception operation 520 includes electronically receiving a previously prepared estimate of the fees and costs eligible for reimbursement by a healthcare coverage entity providing coverage to the patient for the healthcare service. In an embodiment, the coverage reception operation may be implemented using the communication device(s) 360 described in conjunction with FIG. 6. A service-provided operation 530 includes electronically receiving data at least partially indicative of the healthcare service provided to the patient to date. In an embodiment, the receiving data includes receiving data partially indicative of the healthcare service provided to the patient to date. In an embodiment, the service-provided reception operation may be implemented using the communication device(s) 360 described in conjunction with FIG. 6. An expenditure-assessment operation 540 includes estimating probable fees and costs incurred to date in providing the healthcare service to the particular patient. The estimating is responsive to the received data indicative of at least part of the healthcare service provided to date. In an embodiment, the expenditure-assessment operation may be implemented using the processing unit 320 described in conjunction with FIG. 6. A coverage-evaluation operation 550 includes estimating a probable reimbursement by the healthcare coverage entity of the estimated probable fees and cost incurred to date in providing the healthcare service. In an embodiment, the coverage-evaluation operation may be implemented using the processing unit 320 described in conjunction with FIG. 6. A communication operation 530 includes outputting information indicative of the probable reimbursement by the healthcare coverage entity of the estimated probable fees and cost incurred to date in providing the healthcare service. For example, the communication operation may be implemented using a display 370 illustrated in conjunction with FIG. 6 below. The operational flow includes an end operation. For example, the communication operation may include outputting the information to another device coupled with the network 380. The operational flow includes an end operation.

In an embodiment of the service-provided operation 530, the electronically receiving data includes electronically receiving data inputted by the patient and partially indicative of the healthcare service provided to the patient to date. In an embodiment of the expenditure-assessment operation 540, the estimating a probable fees and costs incurred to date further includes estimating with a prediction interval a probable fees and costs incurred to date.

In an embodiment, the prediction interval is 90% or narrower. In an embodiment, the coverage-evaluation operation 550 includes estimating a probable reimbursement by the healthcare coverage entity providing coverage to the particular patient for the healthcare service responsive to a reimbursement parameter of the healthcare coverage entity. In an embodiment, the estimating a probable reimbursement includes estimating a probable reimbursement by the healthcare coverage entity of the estimated probable fees and cost incurred to date in providing the healthcare service in view of previous reimbursements, deductibles, or out of pocket limits applicable to the patient. In an embodiment, the estimating a probable reimbursement includes estimating a probable reimbursement by the healthcare coverage entity of the estimated probable fees and cost incurred to date in providing the healthcare service in view of (i) the previous forecast of the fees and costs eligible for reimbursement by a healthcare coverage entity and (ii) the previous reimbursements, deductibles, or out of pocket limits applicable to the patient. In an embodiment, the estimating a probable reimbursement further includes estimating an effect on future deductible and out-of-pocket limits in the coverage provided to the patient by the healthcare coverage entity because of the probable reimbursement. In an embodiment, the estimating a probable reimbursement includes estimating with a prediction interval a probable reimbursement of the estimated probable fees and costs for delivering the healthcare service to date. In an embodiment, the prediction interval is 90% or narrower.

In an embodiment of the communication operation 530, the outputting information further includes outputting information indicative of the probable fees and costs incurred to date in providing the healthcare service. In an embodiment, the outputting information further includes outputting information indicative of the probable fees and costs incurred to date in providing the healthcare service in view of the previous estimate of the fees and costs for providing the healthcare service. In an embodiment, the outputting information further includes outputting a forecasted patient responsibility for the healthcare service. In an embodiment, the outputting information includes outputting the information in substantially real time. In an embodiment, the outputting information includes outputting the information in substantially real time after electronically receiving a request for information. In an embodiment, the healthcare coverage entity includes a private healthcare insurance company, Medicare, or Medicaid. In an embodiment, the healthcare coverage entity includes a government sponsored organization or a managed healthcare organization. In an embodiment, the computer-implemented operational flow 500 further includes electronically receiving a request for information indicative of fees and costs incurred to date in providing the healthcare service to the particular patient.

FIG. 9 illustrates an example operational flow 600 implemented in a computing device 601. For example, the computing device may be substantially similar to the computing device 302 described in conjunction with FIG. 6. After a start operation, the operational flow includes a request-reception operation 610. The request-reception operation includes electronically receiving a request for information indicative of fees and costs incurred by a particular patient being provided a diagnosis or treatment of a particular disease, illness, injury or other physical or mental impairment (hereafter "healthcare service"). In an embodiment, the request-reception operation may be implemented using the communication device(s) 360 described in conjunction with FIG. 6. A service-provided reception operation 620 includes electronically receiving data at least partially indicative of the healthcare service provided to the patient as of receipt of the request for information. In an embodiment, the receiving data includes receiving data partially indicative of the healthcare service provided to the patient as of receipt of the request for information. In an embodiment, the service-provided reception operation may be implemented using the communication device(s) 360 described in conjunction with FIG. 6. An expenditure-assessment operation 630 includes estimating probable fees and costs incurred to date in providing the healthcare service to the particular patient. The estimating is responsive to the received data indicative of at least part of services provided to date. In an embodiment, the expenditure-assessment operation may be implemented using the processing unit 320 described in conjunction with FIG. 6. A communication operation 640 includes outputting information indicative of the probable fees and costs incurred in providing the healthcare service to the patient as of receipt of the request for information. In an embodiment, the communication operation may be implemented using the communication device(s) 360 described in conjunction with FIG. 6. The operational flow includes an end operation.

In an embodiment, a prediction interval for the estimated probable fees and costs incurred to date is 90% or narrower. In an embodiment of the communication operation 640, the outputting information includes outputting the information in substantially real time. In an embodiment, the outputting information includes outputting the information in substantially real time after electronically receiving the request for information.

FIG. 10 illustrates an example operational flow 700 implemented in a computing device 701. For example, the computing device may be substantially similar to the computing device 302 described in conjunction with FIG. 6. After a start operation, the operational flow includes a request-reception operation 710. The request-reception operation includes electronically receiving a request for information indicative of fees and costs incurred by a particular patient being provided a diagnosis or treatment of a particular disease, illness, injury or other physical or mental impairment (hereafter "healthcare service"). In an embodiment, the request-reception operation may be implemented using the communication device(s) 360 described in conjunction with FIG. 6. A service-provided reception operation 720 includes electronically receiving data at least partially indicative of the healthcare service provided to the patient as of receipt of the request for information. In an embodiment, the receiving data includes receiving data partially indicative of the healthcare service provided to the patient as of receipt of the request for information. In an embodiment, the service-provided reception operation may be implemented using the communication device(s) 360 described in conjunction with FIG. 6. An expenditure-assessment operation 730 includes estimating probable fees and costs incurred to date in providing the healthcare service to the particular patient. The estimating is responsive to the received data indicative of at least part of services provided to date. In an embodiment, the expenditure-assessment operation may be implemented using the processing unit 320 described in conjunction with FIG. 6. A coverage-evaluation operation 740 includes estimating a probable reimbursement by a healthcare coverage entity providing coverage to the patient for the healthcare service of the estimated probable fees and cost incurred to date. A communication operation 750 includes outputting information indicative of (i) the probable fees and costs incurred to date in providing the healthcare service, and (ii) the probable reimbursement by the healthcare coverage entity of the estimated probable fees and costs incurred to date in providing the healthcare service. In an embodiment, the communication operation may be implemented using the communication device(s) 360 described in conjunction with FIG. 6. The operational flow includes an end operation.

In an embodiment of the expenditure-assessment operation 730, a prediction interval for estimating a probable fees and costs incurred to date is 90% or narrower. In an embodiment of the coverage-evaluation operation 740, a prediction interval for estimating a probable reimbursement is 90% or narrower. In an embodiment of the communication operation 750, the outputting information includes outputting the information in substantially real time after electronically receiving the request for information.

FIG. 11 illustrates an example operational flow 800 implemented in a computing device 801. For example, the computing device may be substantially similar to the computing device 302 described in conjunction with FIG. 6. After a start operation, the operational flow includes a request-reception operation 810. The request-reception operation includes electronically receiving a request for information indicative of future fees and costs to be incurred by a particular patient presently undergoing a diagnosis, treatment, or prevention of a particular disease, illness, injury, or other physical or mental impairment (hereafter "healthcare service"). In an embodiment, the request-reception operation may be implemented using the communication device(s) 360 described in conjunction with FIG. 6. A service-provided operation 820 includes electronically receiving data at least partially indicative of the healthcare service provided to the patient as of receipt of the request for information. In an embodiment, the receiving data includes receiving data partially indicative of the healthcare service provided to the patient as of receipt of the request for information. In an embodiment, the service-provided reception operation may be implemented using the communication device(s) 360 described in conjunction with FIG. 6. A prediction operation 830 includes forecasting probable fees and costs to complete delivery of the healthcare service to the patient. The forecasting is responsive to the received data and on a characteristic of the healthcare service. In an embodiment, the prediction operation may be implemented using the processing unit 320 described in conjunction with FIG. 6. A communication operation 840 includes outputting in substantially real time information indicative of the probable future fees and costs to complete delivery of the healthcare service to the patient. In an embodiment, the communication operation may be implemented using the communication device(s) 360 or the display 370 described in conjunction with FIG. 6. The operational flow includes an end operation.

In an embodiment, "estimating" probable fees and costs includes an examination, assessment, evaluation, or analysis of data or information related to a portion of a healthcare service that has already been delivered in order to form a judgment or opinion of the incurred fees and costs. In such an embodiment, "estimating" includes a backward looking or historical process. In an embodiment, "forecasting" probable fees and costs includes an examination, assessment, evaluation, or analysis of data or information related to a healthcare service that is expected to be delivered or in advance of delivery in order to form a judgment or opinion what the incurred fees and costs will be. In such an embodiment, "forecasting" includes a forward looking process.

In an embodiment of the prediction operation 830, the forecasting probable fees and costs to complete delivery includes forecasting probable fees and costs to complete delivery up to a point of discharge from a healthcare facility. In an embodiment, the forecasting probable fees and costs to complete delivery includes forecasting probable fees and costs to complete delivery, including post discharge fees and costs. In an embodiment, the forecasting probable fees is responsive to an algorithm responsive to medical codes relevant to provision of the healthcare service by at least one of a physician, health worker, hospital, facility, equipment, operating room, procedure, imaging, lab request, or report. In an embodiment, the forecasting probable fees is responsive to an algorithm responsive to a description of healthcare services provided to the patient by at least one of a physician, health worker, hospital, facility, equipment, operating room, procedure, imaging, lab request, or report. In an embodiment, the forecasting probable fees is responsive to an algorithm responsive to a healthcare event that occurred in providing the healthcare service. In an embodiment, the healthcare event includes at least one of a physician, health worker, hospital, facility, equipment, operating room, procedure, imaging, lab request, or report relevant to the healthcare service provided to the patient. In an embodiment, the forecasting probable fees is responsive to an algorithm responsive to a likely treatment scenario for the particular disease, illness, injury, or other physical or mental impairment. In an embodiment, the forecasting probable fees and costs to complete delivery is responsive to contractually allowable charges by a healthcare coverage entity providing coverage to the patient for the healthcare service. For example, the contractually allowed charges may include contractually allowed charges for one or more elements of the healthcare service. In an embodiment, the forecasting probable fees and costs to complete delivery is responsive to rule sets and reimbursement policies of a healthcare coverage entity providing coverage to the patient for the healthcare service. In an embodiment, the forecasting probable fees and costs includes forecasting with a prediction interval probable fees and costs to complete delivery of the healthcare service. In an embodiment, a prediction interval for forecasting probable fees and costs to complete delivery is 90% or narrower. In an embodiment of the prediction operation, the forecasting probable fees and costs includes forecasting probable fees and costs to complete delivery and a probability that the forecasted fees and costs incurred to date will be less than a given value.

In an embodiment of the communication operation 840, the outputting information includes outputting the information in substantially real time after electronically receiving the request for information.

Figure 12:
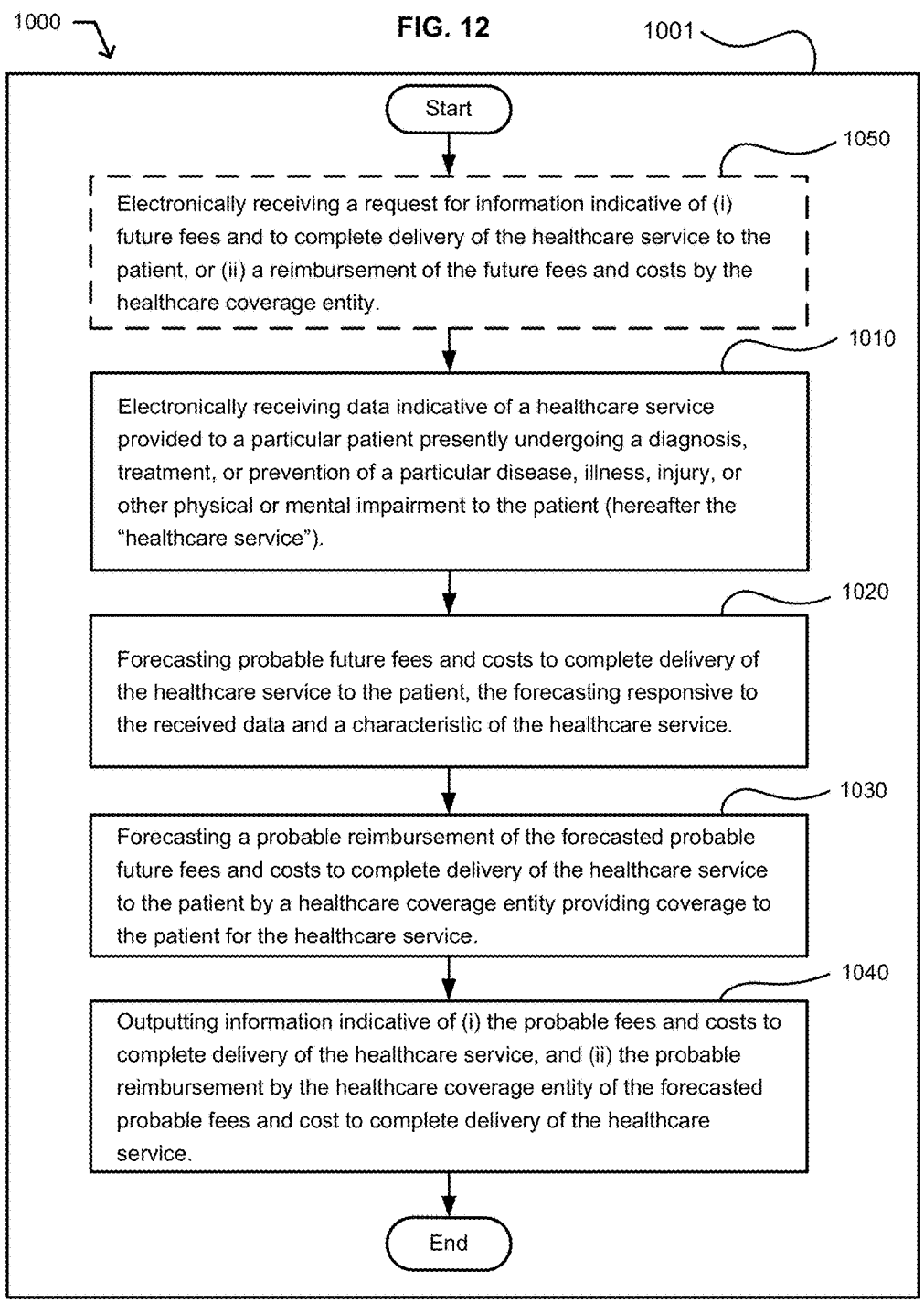
FIG. 12 illustrates an example operational flow 1000 implemented in a computing device 1001.

FIG. 12 illustrates an example operational flow 1000 implemented in a computing device 1001. For example, the computing device may be substantially similar to the computing device 302 described in conjunction with FIG. 6. After a start operation, the operational flow includes a treatment reception operation 1010. The treatment reception operation includes electronically receiving data indicative of a healthcare service provided to a particular patient presently undergoing a diagnosis, treatment, or prevention of a particular disease, illness, injury, or other physical or mental impairment to the patient (hereafter the "healthcare service"). In an embodiment, the data indicative of a healthcare service provided includes data indicative of a healthcare service provided to a particular patient as of receipt of a request for information. In an embodiment, the treatment reception operation may be implemented using the communication device(s) 360 described in conjunction with FIG. 6. A fees and costs prediction operation 1020 includes forecasting probable future fees and costs to complete delivery of the healthcare service to the patient. The forecasting is responsive to the received data and a characteristic of the healthcare service. In an embodiment, the fees and costs prediction operation may be implemented using the processing unit 320 described in conjunction with FIG. 6. A coverage forecasting operation 1030 includes forecasting a probable reimbursement of the forecasted probable future fees and costs to complete delivery of the healthcare service to the patient by a healthcare coverage entity providing coverage to the patient for the healthcare service. In an embodiment, the coverage forecasting operation may be implemented using the processing unit 320 described in conjunction with FIG. 6. A communications operation 1040 includes outputting information indicative of (i) the probable fees and costs to complete delivery of the healthcare service, and (ii) the probable reimbursement by the healthcare coverage entity of the forecasted probable fees and cost to complete delivery of the healthcare service. In an embodiment, the communication operation may be implemented using the communication device(s) 360 or the display 370 described in conjunction with FIG. 6. The operational flow includes an end operation.

In an embodiment, the operational flow 1000 includes 1050 electronically receiving a request for information indicative of (i) future fees and to complete delivery of the healthcare service to the patient, or (ii) a reimbursement of the future fees and cost by the healthcare coverage entity. In an embodiment, the request is for information as of the date of the request. In an embodiment, the request is for information as of a date prior to the date of the request.

In an embodiment of the coverage forecasting operation 1030, the forecasting a probable reimbursement includes forecasting with a prediction interval a probable reimbursement by a healthcare coverage entity of the forecasted probable future fees and cost to complete delivery of the healthcare service to the patient. In an embodiment, the prediction interval is 90% or narrower. In an embodiment, the outputting information includes outputting the information in substantially real time after electronically receiving the request for information.

Returning to FIG. 6, in an alternative embodiment of the computing device 302, the computer storage media stores an alternative embodiment of the computer-executable instructions. In the alternative embodiment, the computer-executable instructions which, when executed by a processor such as the processing unit 320 of the computing device, cause the computing device to perform a process. The process includes receiving a request for information indicative of (i) future fees and costs to be incurred by a particular patient presently undergoing a diagnosis, treatment, or prevention of a particular disease, illness, injury, or other physical or mental impairment (hereafter "healthcare service") and (ii) reimbursement of the future fees and cost by a healthcare coverage entity providing coverage to the patient for the healthcare service. The process includes receiving data at least partially indicative of the healthcare service provided to the patient as of receipt of the request for information. In an embodiment, the receiving data includes receiving data partially indicative of the healthcare service provided to the patient as of receipt of the request for information. The process includes forecasting probable future fees and costs to complete delivery of the healthcare service to the patient. The forecasting is responsive to the received data and a characteristic of the healthcare service. The process includes forecasting a probable reimbursement by a healthcare coverage entity of the forecasted probable future fees and costs to complete delivery of the healthcare service to the patient. The process includes outputting information indicative of (i) the probable fees and costs to complete delivery of the healthcare service, and (ii) the probable reimbursement by the healthcare coverage entity of the forecasted probable fees and cost to complete delivery of the healthcare service.

FIG. 13 illustrates an example computer program product 1100. The computer program product includes a computer-readable medium 1110 bearing program instructions 1120. The program instructions which, when executed by a processor of a computing device, cause the computing device to perform a process. The process includes electronically receiving a request for information indicative of (i) future fees and costs to be incurred by a particular patient presently undergoing a diagnosis, treatment, or prevention of a particular disease, illness, injury, or other physical or mental impairment (hereafter "healthcare service") and (ii) reimbursement of the future fees and cost by a healthcare coverage entity providing coverage to the patient for the healthcare service. The process includes electronically receiving data at least partially indicative of the healthcare service provided to the patient as of receipt of the request for information. In an embodiment, the receiving data includes receiving data partially indicative of the healthcare service provided to the patient as of receipt of the request for information. The process includes forecasting a probable future fees and costs to complete delivery of the healthcare service to the patient. The forecasting is responsive to the received data and a characteristic of the healthcare service. The process includes forecasting a probable reimbursement by a healthcare coverage entity of the forecasted probable future fees and cost to complete delivery of the healthcare service to the patient. The process includes outputting in substantially real time information indicative of (i) the probable fees and costs to complete delivery of the healthcare service, and (ii) the probable reimbursement by the healthcare coverage entity of the forecasted probable fees and cost to complete delivery of the healthcare service.

In an embodiment, the computer-readable medium 1110 includes a tangible computer storage media 1112. In an embodiment, the computer-readable medium includes a communication media 1114.

FIG. 14 illustrates an example operational flow 1200 implemented in a computing device 1201. For example, the computing device may be substantially similar to the computing device 302 described in conjunction with FIG. 6. After a start operation, the operational flow includes an estimate-reception operation 1210. The estimate-reception operation includes electronically receiving a previously prepared estimate of fees and costs to diagnose, treat, or prevent a particular disease, illness, injury, or other physical or mental impairment (hereafter "healthcare service") in a particular patient. In an embodiment, the estimate-reception operation may be implemented using the communication device(s) 360 described in conjunction with FIG. 6. A request-reception operation 1220 includes electronically receiving a request for information indicative of future fees and costs to be incurred in completing delivery of the healthcare service to the patient. In an embodiment, the request-reception operation may be implemented using the communication device(s) 360 described in conjunction with FIG. 6. A service-provided reception operation 1230 includes electronically receiving data at least partially indicative of healthcare service provided to the patient as of receipt of the request for information. In an embodiment, the receiving data includes receiving data partially indicative of the healthcare service provided to the patient as of receipt of the request for information. In an embodiment, the service-provided operation may be implemented using the communication device(s) 360 described in conjunction with FIG. 6. An evaluation operation 1240 includes estimating probable fees and costs incurred as of receipt of the request for information in providing the healthcare service to the patient. The estimating is responsive to the received data indicative of at least part of the healthcare service provided to date. In an embodiment, the evaluation operation may be implemented using the processing unit 320 described in conjunction with FIG. 6. A fees and costs prediction operation 1250 includes forecasting probable future fees and costs to complete delivery of the healthcare service to the patient.

The forecasting probable future fees and costs is responsive to the received data and a characteristic of the healthcare service. In an embodiment, the fees and costs prediction operation may be implemented using the processing unit 320 described in conjunction with FIG. 6. A summation operation 1260 includes forecasting probable total fees and costs for the delivery of the healthcare service to the patient. The forecasting probable total fees and costs is responsive to a combination of the forecasted probable fees and costs incurred and forecasted probable future fees and costs to complete delivery. In an embodiment, the summation operation may be implemented using the processing unit 320 described in conjunction with FIG. 6. A communication operation 1270 includes outputting in substantially real time information indicative of the probable total fees and costs to complete delivery of the healthcare service to the patient in view of the previous forecast of fees and costs. In an embodiment, the communication operation may be implemented using the communication device(s) 360 or the display 370 described in conjunction with FIG. 6. The operational flow includes an end operation.

In an embodiment of the summation operation 1260, the forecasting a probable total fees and costs includes forecasting with a prediction interval a probable total fees and costs for the delivery of the healthcare service to the patient. In an embodiment, the prediction interval is 90% or narrower. In an embodiment of the communication operation 1270, the outputting information includes outputting the information in substantially real time after electronically receiving the request for information. In an embodiment, the outputting further includes outputting information indicative of when a specified fees and costs threshold will likely be reached. For example, the information may be indicative of when or under which treatment scenarios a specified fees and costs threshold will likely be reached. For example, the information may include a threshold of current charges, i.e., "on Thursday you'll have racked up $5000." For example, the information may include eventual charges, i.e., if you don't change something by Wednesday, your responsibility upon discharge will reach $6000. For example, the threshold can be total money, can be deductible limits, or the like.

In an embodiment, the operational flow 1200 includes forecasting 1280 a probable total reimbursement of the forecasted probable total fees and cost by a healthcare coverage entity providing coverage to the patient for the healthcare service. In an embodiment of the communication operation 1270, the outputting information further includes outputting information indicative of the probable total reimbursement by a healthcare coverage entity of the forecasted probable total fees and costs for delivery of the healthcare service to the patient.

FIG. 15 illustrates an example operational flow 1300 implemented in a computing device 1301. For example, the computing device may be substantially similar to the computing device 302 described in conjunction with FIG. 6. After a start operation, the operational flow includes a request-reception operation 1310. The request-reception operation includes electronically receiving a request for information indicative of future fees and costs to be incurred by a particular patient presently undergoing a diagnosis, treatment, or prevention of a particular disease, illness, injury, or other physical or mental impairment (hereafter "healthcare service"). In an embodiment, the request-reception operation may be implemented using the communication device(s) 360 described in conjunction with FIG. 6. A service-provided reception operation 1320 includes electronically receiving data at least partially indicative of the healthcare service provided to the patient as of receipt of the request for information. In an embodiment, the receiving data includes receiving data partially indicative of the healthcare service provided to the patient as of receipt of the request for information. In an embodiment, the service-provided reception operation may be implemented using the communication device(s) 360 described in conjunction with FIG. 6. A fees and costs prediction operation 1330 includes forecasting probable future fees and costs to complete delivery of the healthcare service to the patient. The forecasting is responsive to the received data and a characteristic of the healthcare service. In an embodiment, the fees and costs prediction operation may be implemented using the processing unit 320 described in conjunction with FIG. 6. A healthcare option operation 1340 includes identifying an efficacious alternative healthcare service option for the particular disease, illness, injury, or other physical or mental impairment (hereafter "alternative healthcare service"). In an embodiment, the healthcare option operation may be implemented using the processing unit 320 described in conjunction with FIG. 6. A communication operation 1350 includes outputting in substantially real time information indicative of (i) the forecasted probable future fees and costs to complete delivery of the healthcare service to the patient and (ii) the efficacious alternative healthcare service option. In an embodiment, the communication operation may be implemented using the communication device(s) 360 or the display 370 described in conjunction with FIG. 6. The operational flow includes an end operation.

In an embodiment of the healthcare option operation 1340, the identifying an efficacious alternative healthcare service option is responsive to a characteristic of the particular disease, illness, injury, or other physical or mental impairment. In an embodiment, the identifying an efficacious alternative healthcare service option is responsive to the received data. In an embodiment, the identifying an efficacious alternative healthcare service option is responsive to a characteristic of the particular healthcare service. In an embodiment, the identifying an efficacious alternative healthcare service option is responsive to an accepted medical practice, a prevailing medical practice, or a standard of an accepted medical practice. In an embodiment, the identifying an efficacious alternative healthcare service option is responsive to a risk of the alternative healthcare service option. In an embodiment, the identifying an efficacious alternative healthcare service option is responsive to an efficacy of the alternative healthcare service option. In an embodiment, the identifying an efficacious alternative healthcare service option is responsive to the probable future fees and costs to complete delivery of the healthcare service to the patient. In an embodiment, the identifying an efficacious alternative healthcare service option is responsive to a probable future fees and costs of the alternative healthcare service option. In an embodiment, the identifying an efficacious alternative healthcare service option is responsive to a database of at least two alternative and efficacious diagnoses or treatments of the particular disease, illness, injury or other physical or mental impairment (hereafter "an alternative healthcare service"). In an embodiment, the database of at least two efficacious alternative diagnoses or treatments includes probable fees and costs for the at least two efficacious alternative diagnoses or treatments.

In an embodiment of the communication operation 1350, the outputting information includes outputting information indicative of the efficacious alternative healthcare service option, and forecasted probable fees and costs associated with the efficacious alternative healthcare service option. In an embodiment, the outputting information includes outputting information indicative of (iii) the efficacious alternative healthcare service option, forecasted probable fees and costs associated with the efficacious alternative healthcare service option, and (iv) forecasted probable reimbursement by a healthcare coverage entity of the forecasted probable future fees and costs associated with the efficacious alternative healthcare service option. In an embodiment, the outputting information includes outputting information indicative of (iii) efficacy and risk factors associated with the efficacious alternative healthcare service option.

In an embodiment of the healthcare option operation 1340, the identifying an efficacious alternative healthcare service option includes identifying at least two efficacious alternative healthcare service options for the particular disease, illness, injury, or other physical or mental impairment. In an embodiment, the outputting information includes outputting information indicative of at least two efficacious alternative healthcare service options, and likely treatment scenarios for each of the at least two efficacious alternative healthcare service options. In an embodiment, the likely treatment scenarios for each of the at least two efficacious alternative healthcare service options include forecasted probable fees and costs. In an embodiment, the forecasted probable fees and costs include forecasted probable fees and costs and a prediction interval for each of the at least two efficacious alternative healthcare service options. For example, one alternative healthcare service option may have a more narrow prediction interval than another. The patient may want to select an alternative healthcare service option with a prediction interval indicating more confidence the forecasted probable fees and costs. In an embodiment, the forecasted probable fees and costs are stated as a function of inpatient days in a healthcare facility. In an embodiment of the communication operation 1350, the outputting information includes outputting information indicative of at least two efficacious alternative healthcare service options, and forecasted probable fees and costs associated with each of the at least two efficacious alternative healthcare service options. For example, the information may be indicative of different lengths of stay, different tests, different treatment options, different physicians, different healthcare workers, different post-stay regimens, or the like. In an embodiment, the at least two efficacious alternative healthcare service options can be selected by the patient, by the healthcare provider, or by the insurance company.

In an embodiment of the fees and costs prediction operation 1330, the forecasting probable future fees and costs includes forecasting with a prediction interval probable future fees and costs to complete delivery of the healthcare service. In an embodiment, the prediction interval is 90% or narrower. In an embodiment of the communication operation 1330, the outputting information includes outputting the information in substantially real time after electronically receiving the request for information.

Returning to FIG. 6, in an alternative embodiment of the computing device 302, the computer storage media stores an alternative embodiment of the computer-executable instructions. In the alternative embodiment, the computer-executable instructions which, when executed by a processor such as the processing unit 320 of the computing device, cause the computing device to perform a process. The process includes receiving a request for information indicative of future fees and costs to be incurred by a particular patient presently undergoing a diagnosis, treatment, or prevention of a particular disease, illness, injury, or other physical or mental impairment (hereafter "healthcare service"). The process includes receiving data at least partially indicative of the healthcare service provided to the patient as of receipt of the request for information. In an embodiment, the receiving data includes receiving data partially indicative of the healthcare service provided to the patient as of receipt of the request for information. The process includes forecasting probable future fees and costs to complete delivery of the healthcare service to the patient, the forecasting responsive to the received data and a characteristic of the healthcare service. The process includes identifying an efficacious alternative healthcare service option for the particular disease, illness, injury, or other physical or mental impairment. The process includes outputting in substantially real time information indicative of (a) the forecasted probable future fees and costs to complete delivery of the healthcare service to the patient and (b) the efficacious alternative healthcare service option.

FIG. 16 illustrates an example computer program product 1400. The computer program product includes a computer-readable medium 1410 bearing program instructions 1420. The program instructions which, when executed by a processor of a computing device, cause the computing device to perform a process. The process includes receiving a request for information indicative of future fees and costs to be incurred by a particular patient presently undergoing a diagnosis, treatment, or prevention of a particular disease, illness, injury, or other physical or mental impairment (hereafter "healthcare service"). The process includes receiving data at least partially indicative of the healthcare service provided to the patient as of receipt of the request for information. In an embodiment, the receiving data includes receiving data partially indicative of the healthcare service provided to the patient as of receipt of the request for information. The process includes forecasting probable future fees and costs to complete delivery of the healthcare service to the patient. The forecasting is responsive to the received data and a characteristic of the healthcare service. The process includes identifying an efficacious alternative healthcare service option for the particular disease, illness, injury, or other physical or mental impairment. The process includes outputting in substantially real time information indicative of (a) the forecasted probable future fees and costs to complete delivery of the healthcare service to the patient and (b) the efficacious alternative healthcare service option.

In an embodiment, the computer-readable media 1410 includes a tangible computer-readable medium 1412. In an embodiment, the computer-readable media includes a communication media. 1414.

FIG. 17 illustrates an example operational flow 1500 implemented in a computing device 1501. For example, the computing device may be substantially similar to the computing device 302 described in conjunction with FIG. 6. After a start operation, the operational flow includes a context-reception operation 1510. The context-reception operation includes electronically receiving data indicative of at least part of a diagnosis, treatment, or prevention of a particular disease, illness, injury, or other physical or mental impairment (hereafter "healthcare service") provided to a particular patient. The received data including at least one of (i) data indicative of an activity within a proximity of the patient, or (ii) data inputted by the patient and relevant to determining a parameter of the healthcare service provided to the patient. For example, the context-reception operation may be implemented using the communication device(s) 360 of the computing device 302 described in conjunction with FIG. 6. A data mining operation 1520 includes converting the received data into information indicative of one or more units of service provided to the patient. For example, the information may include information describing, representing, classifying, or measuring something relevant to costs or fees for the healthcare service provided to the patient, such as physician visits, room occupancy, procedures, lab technician visits, or the like. For example, the data mining operation may be implemented by the processing unit 320 applying a data mining algorithm saved in a storage, such as the non-removable storage 334, and loaded in the system memory 310 of the computing device 302 described in conjunction with FIG. 6. An evaluation operation 1530 includes estimating probable fees and costs incurred to date in providing the healthcare service to the patient. The estimating is responsive to the information indicative of units of healthcare service provided to the patient. For example, the evaluation operation may be implemented by the processing unit 320 applying an evaluation algorithm saved in a storage, such as the non-removable storage 334, and loaded in the system memory 310 of the computing device 302 described in conjunction with FIG. 6. A communication operation 1540 includes outputting information indicative of the probable fees and costs incurred to date providing the healthcare service. For example, the communication operation may be implemented using a display 370 described in conjunction with FIG. 6. For example, the communication operation may include outputting the information to another device coupled with the network 380 using the communication device(s) 360 described in conjunction with FIG. 6. The operational flow includes an end operation.

In an embodiment of the context-reception operation 1510, the data based on an activity includes data based on a human activity. In an embodiment, the data based on an activity includes data based on an equipment item present within a proximity of the patient. In an embodiment, the data based on an activity includes data based on a space or room in which the patient is present for a period of time. In an embodiment, the within a proximity of the patient includes within about 15 feet from the patient. In an embodiment, the within a proximity of the patient includes within about 10 feet from the patient. In an embodiment, the within a proximity of the patient includes a proximity of within about 5 feet from the patient. In an embodiment, the within a proximity of the patient includes a presence within a room or space occupied by the patient. In an embodiment, the patient includes a patient admitted to a healthcare facility. In an embodiment, the healthcare service is provided to the patient in a healthcare facility. In an embodiment, the data based on an activity within a proximity of the patient includes data based on a duration of an activity within a proximity of the patient.

In an embodiment of the context-reception operation 1510, the data based on an activity within a proximity of the patient includes data indicative of an identification of a healthcare provider or facility staff member entering within a proximity of the patient. In an embodiment, the data indicative of an identification of a healthcare provider or facility staff member is automatically acquired. For example, in an embodiment, automatically acquired includes acquired in a manner essentially independent of or with a minimal external influence or control over the acquisition by a human. For example, automatic acquisition may include automatic acquisition by an imaging device (i.e. face or badge reader), motion activated sensor, an RFID reader reading and RFID tag worn by entrant, or sound activated sensor (i.e. by a sound of a door or footsteps). In an embodiment, acquisition of the data indicative of an identification of a healthcare provider or facility staff member is initiated by the patient. In an embodiment, acquisition of the data indicative of an identification of a healthcare provider or facility staff member is initiated by a person other than the patient or the healthcare provider or facility staff member. In an embodiment, the data based on an activity includes an image of a healthcare provider or facility staff member entering within the proximity range of the patient. In an embodiment, the image includes a still or moving picture image. In an embodiment, the image is automatically captured. For example, capture of the image may be initiated by a motion sensor, or by a sound of a door or footsteps. In an embodiment, the capture of the image is initiated by the patient or by a third-party. For example, since the patient may not know the name of a physician, healthcare worker, or nurse who wanders by, they can upload photographs, which the system then compares with database of hospital personnel.

In an embodiment of the context-reception operation 1510, the data inputted by the patient includes data inputted by the patient and indicative of an identity of a particular healthcare provider or facility staff member entering within the proximity of the patient. For example, the patient may identify a physician or a healthcare worker with partial names, physical descriptions, or the like, which allow identification from databases. For example, the patient may take photos of identification badges, or initiate electronically-read identification badges or other identifiers. For example, the patient may enter images or video of procedures. For example, the patient may identify devices or equipment used in their treatment. For example, input of data by the patient may be by verbal description, by image recognition, by reading an RFID tag, or the like. For example, the patient or a computing device managed by the patient may input non-structured information about the treatment received. For example, since the patient probably does not know treatment codes, they can enter for example a colloquial description of treatments they received using text or voice. For example, the patient can also enter other, more structured information, such as room number, shared occupancy, admission date, and the like.

In an embodiment of the data mining operation 1520, a unit of service includes a physician contact or visit. In an embodiment, a unit of service includes a healthcare provider contact or visit. In an embodiment, a unit of service includes one or more laboratory tests, imaging, or procedures. In an embodiment, a unit of service includes one or more pharmacy items. In an embodiment, a unit of service includes a hospital day, facility charge, equipment charge, or emergency room hour. In an embodiment, a unit of service includes a modification factor responsive to an efficiency rating, history, regional cost history/experience, or outcomes of a healthcare facility providing the healthcare service. In an embodiment, a unit of service includes a modification factor responsive to an efficiency rating of an attending physician or historical outcomes.

In an embodiment of the data mining operation 1520, the converting the received data into information further includes converting an instance of information into a treatment code. In an embodiment, the converting an instance of information into a treatment code is at least partially based upon the type or characteristic of the healthcare service. In an embodiment, the converting at an instance of information into a treatment code is at least partially based upon a standard procedure of an attending physician or a healthcare facility providing the healthcare service. In an embodiment, the converting includes converting the received data into information indicative of one or more units of service provided to the patient and indicating a confidence interval for information.

In an embodiment, the operational flow 1500 may include electronically receiving a request for the information indicative of probable fees and costs incurred to date providing the healthcare service. In an embodiment, the operational flow may include querying the patient for a clarification of the received data or for additional data possibly relevant to the estimating probable fees and costs. In an embodiment, the operational flow may include estimating a probable reimbursement by a healthcare coverage entity of the probable fees and costs incurred to date in providing the healthcare service. In an embodiment, the operational flow may include outputting information indicative of the probable reimbursement by the healthcare coverage entity of the probable fees and costs incurred to date in providing the healthcare service.

In an embodiment of the evaluation operation 1530, the estimating probable fees and costs includes estimating with a prediction level probable fees and costs incurred to date. In an embodiment of the communication operation 1540, the outputting information includes outputting the information in substantially real time after electronically receiving a request for information.

Returning to FIG. 6, in another alternative embodiment of the computing device 302, the computer storage media stores an alternative embodiment of the computer-executable instructions. In the alternative embodiment, the computer-executable instructions which, when executed by a processor such as the processing unit 320 of the computing device, cause the computing device to perform a process. The process includes receiving data indicative of at least part of a diagnosis, treatment, or prevention of a particular disease, illness, injury, or other physical or mental impairment (hereafter "healthcare service") provided a particular patient. The received data is indicative of at least one of (i) data based on a healthcare service activity within a proximity of the patient, or (ii) data inputted by the patient and relevant to determining a parameter of the healthcare service provided to the patient. The process includes converting the received data into information indicative of one or more units of service provided to the patient. The process includes estimating probable fees and costs incurred to date in providing the healthcare service to the patient. The estimating is responsive to the information indicative of units of healthcare service provided the patient. The process includes outputting information indicative of the probable fees and costs incurred to date providing the healthcare service.

In an embodiment of the another alternative embodiment, the process further includes receiving a request for the information indicative of probable fees and costs incurred to date providing the healthcare service.

Figure 18:
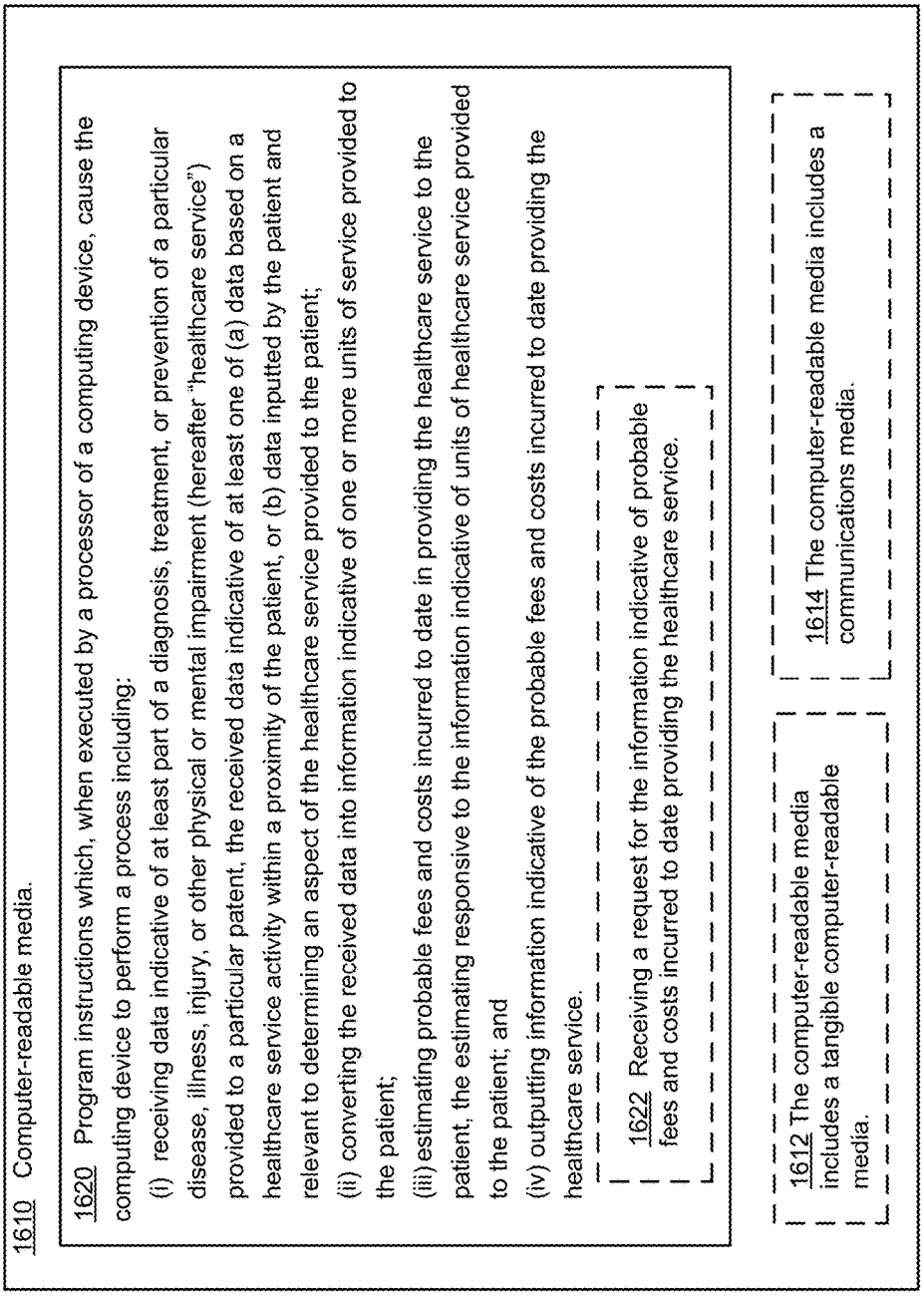
FIG. 18 illustrates an example computer program product 1600.

FIG. 18 illustrates an example computer program product 1600. The computer program product includes a computer-readable medium 1610 bearing program instructions 1620. The program instructions which, when executed by a processor of a computing device, cause the computing device to perform a process. The process includes receiving data indicative of at least part of a diagnosis, treatment, or prevention of a particular disease, illness, injury, or other physical or mental impairment (hereafter "healthcare service") provided to a particular patient. The received data is indicative of at least one of (a) data based on a healthcare service activity within a proximity of the patient, or (b) data inputted by the patient and relevant to determining a parameter of the healthcare service provided to the patient. The process includes converting the received data into information indicative of one or more units of service provided to the patient. The process includes estimating probable fees and costs incurred to date in providing the healthcare service to the patient. The estimating is responsive to the information indicative of units of healthcare service provided to the patient. The process includes outputting information indicative of the probable fees and costs incurred to date providing the healthcare service. In an embodiment, the process further includes 1622 receiving a request for the information indicative of probable fees and costs incurred to date providing the healthcare service.

In an embodiment, the computer-readable medium 1610 includes a computer storage media 1612. In an embodiment, the computer-readable medium includes a communication media 1614.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method performed by a server system, comprising:
    electronically receiving, by a network interface of a server system, a previously prepared estimate of fees and costs to deliver a healthcare service, wherein the healthcare service includes at least one of a diagnosis, treatment, or prevention of a particular disease, illness, injury, or other physical or mental impairment to a particular patient;
    electronically receiving, by the network interface of the server system, a request for information indicative of fees and costs incurred to date in providing the healthcare service to the particular patient;
    electronically receiving, by the network interface of the server system, data at least partially indicative of the healthcare service provided to the patient to date;
    electronically estimating, by a processing unit of the server system, probable fees and costs incurred to date in providing the healthcare service to the particular patient, the estimating based on the received data at least partially indicative of the healthcare service provided to the patient to date;
    electronically estimating, by the processing unit of the server system, a specific day when a specified fees and costs threshold will be reached should the healthcare service continue to be provided to the patient based on the previously prepared estimate of fees and costs and the estimated probable fees and costs incurred to date; and
    eliciting an input from the patient via a mobile device associated with the patient, the elicited input from the patient modifying the data at least partially indicative of the healthcare service provided to the patient to date, the eliciting caused by outputting in substantially real time, by the network interface of the server system, a notification to the mobile device associated with the patient in response to the specific day when the specified fees and costs threshold will be reached being before a previously estimated specific day when the specified fees and costs threshold will be reached, wherein the notification includes information indicative of the probable fees and costs incurred to date in view of the previous estimate of the fees and costs for providing the healthcare service and indicative of the specific day when the specified fees and costs threshold will be reached;
    wherein the elicited input from the patient comprises a photograph taken by the patient using the mobile device, the photograph indicative of an activity occurring within a proximity of the patient related to provision of the healthcare service to the patient.

2. The computer-implemented method of claim 1, wherein the previous estimate of fees and costs includes a previous estimate of fees and costs prepared before delivery or initiation of the particular healthcare service.

3. The computer-implemented method of claim 1, wherein the previous estimate of fees and costs includes a previous estimate of fees and costs prepared at a point during a course delivery of the particular healthcare service.

4. The computer-implemented method of claim 1, wherein the previous estimate of fees and costs includes a previous estimate of physician, health care worker, hospital, facility, equipment, procedure, drug, or supply fees and costs to deliver a particular healthcare service to a particular patient.

5. The computer-implemented method of claim 1, wherein the fees and costs includes fees and costs to deliver a particular treatment, surgery, hospitalization, or rehabilitation healthcare service to a particular patient.

6. The computer-implemented method of claim 1, wherein the receiving a request for information further includes receiving a request for information indicative of a forecast of future fees and costs to be incurred in providing the healthcare service.

7. The computer-implemented method of claim 1, wherein the receiving a request for information further includes receiving a request for information indicative of at least one efficacious healthcare service option for the particular disease, illness, injury, or other physical or mental impairment.

8. The computer-implemented method of claim 1, wherein the receiving a request for information further includes receiving a request for information indicative of fees and costs incurred before or as of the time and date of the request.

9. The computer-implemented method of claim 1, wherein the receiving a request for information further includes receiving a request for information indicative of fees and costs incurred to date in providing the healthcare service to the particular patient in view of the previously prepared estimate of fees and costs.

10. The computer-implemented method of claim 1, wherein the receiving data includes receiving data partially indicative of the health care service provided to the patient as of receipt of the request for information.

11. The computer-implemented method of claim 1, wherein the receiving data includes receiving a medical code for a charge related to the healthcare service.

12. The computer-implemented method of claim 1, wherein the receiving data includes receiving data indicative of a healthcare event that occurred in providing the healthcare service.

13. The computer-implemented method of claim 1, wherein the receiving data includes receiving data inputted by the patient or a representative of the patient and indicative of at least a part of the healthcare service provided to the patient to date.

14. The computer-implemented method of claim 1, wherein the estimating includes forecasting, implying, or inferring probable fees and costs incurred at least partially based upon the received data indicative of at least part of healthcare services provided to date.

15. The computer-implemented method of claim 1, wherein the estimating includes further estimating probable fees and costs incurred at least partially based upon healthcare coverage entity rule sets or algorithms.

16. The computer-implemented method of claim 1, wherein the estimating includes estimating with a prediction interval probable fees and costs incurred to date in providing the healthcare service to the particular patient.

17. The computer-implemented method of claim 16, wherein the prediction interval includes a preselected prediction interval.

18. The computer-implemented method of claim 16, wherein the prediction interval is narrower than 50%.

19. The computer-implemented method of claim 16, wherein the prediction interval is narrower than 70%.

20. The computer-implemented method of claim 16, wherein the prediction interval is 90% or narrower.

21. The computer-implemented method of claim 16, wherein the prediction interval is based at least in part on accuracy of prior predictions of fees and costs incurred in providing the healthcare service to at least ten other patients.

22. The computer-implemented method of claim 1, wherein the outputting information includes outputting the information in substantially real time after receiving a request for information.

23. The computer-implemented method of claim 1, wherein the outputting information includes outputting the information within 60 minutes of the receiving a request for information.

24. The computer-implemented method of claim 1, wherein the outputting information includes outputting the information within 30 minutes of the receiving a request for information.

25. The computer-implemented method of claim 1, wherein the outputting information includes outputting the information within 5 minutes of the receiving a request for information.

26. The computer-implemented method of claim 1, wherein the outputting information includes outputting the information within 30 seconds of the receiving a request for information.

27. The computer-implemented method of claim 1, wherein the outputting information includes outputting the information within 3 seconds of the receiving a request for information.

28. The computer-implemented method of claim 1, wherein the outputting information includes transforming into a particular visual depiction the information indicative of the probable fees and costs incurred to date in view of the previous estimate of the fees and costs for providing the healthcare service, and outputting the particular visual depiction.

29. The computer-implemented method of claim 1, wherein the outputting information further includes outputting information indicative of at least two efficacious healthcare service options for the particular disease, illness, injury, or other physical or mental impairment.

30. The computer-implemented method of claim 1, wherein the outputting information includes outputting information indicative of at least two efficacious alternative healthcare service options, and a likely treatment scenario for each of the at least two efficacious alternative healthcare service options.

31. The computer-implemented method of claim 1, wherein the outputting information includes outputting information indicative of at least two efficacious alternative healthcare service options, and forecasted probable fees and costs associated with each of the at least two efficacious alternative healthcare service options.

32. The computer-implemented method of claim 1, wherein the outputting information includes outputting a signal useable in displaying a human perceivable visual depiction of the information indicative of the probable fees and costs incurred to date in view of the previous estimate of the fees and costs for providing the healthcare service.

33. The computer-implemented method of claim 1, further comprising:
storing data indicative of the outputted information in a computer-readable medium.

34. The computer-implemented method of claim 1, further comprising:
electronically providing, by the network interface of the server system, a notification of an availability of the outputted information to at least one of a human, computer, or system.

35. The computer-implemented method of claim 1, further comprising:
displaying a human-perceivable visual depiction of the information.

36. A computing device comprising:
a display device;
a processor programmed by computer-executable instructions;
a communications circuit configured to receive and send data; and
a computer storage media storing the computer-executable instructions which, when executed by the processor, cause the computing device to perform a process including:
(i) receiving from the communications circuit a previously prepared estimate of fees and costs to deliver a healthcare service, wherein the healthcare service includes at least one of a diagnosis, treatment, or prevention of a particular disease, illness, injury, or other physical or mental impairment to a particular patient;

(ii) receiving from the communications circuit a request for information indicative of fees and costs incurred to date in providing the healthcare service to the particular patient;

(iii) receiving from the communications circuit data at least partially indicative of the healthcare service provided to the patient to date;

(iv) estimating, by the processor, probable fees and costs incurred to date in providing the healthcare service to the particular patient, the estimating based on the received data indicative of at least part of the healthcare service provided to date;

(v) estimating, by the processor, a specific day when a specified fees and costs threshold will be reached should the healthcare service continue to be provided to the patient based on the previously prepared estimate of fees and costs and the estimated probable fees and costs incurred to date; and (vi) eliciting an input from the patient via a mobile device associated with the patient, the elicited input from the patient modifying the data at least partially indicative of the healthcare service provided to the patient to date, the eliciting caused by outputting in substantially real time, via the communications circuit, a notification to the mobile device associated with the patient in response to the specific day when the specified fees and costs threshold will be reached being before a previously estimated specific day when the specified fees and costs threshold will be reached, wherein the notification includes information indicative of the probable fees and costs incurred to date in view of the previous estimate of the fees and costs for providing the healthcare service and indicative of the specific day when the specified fees and costs threshold will be reached;

wherein the elicited input from the patient comprises a photograph taken by the patient using the mobile device, the photograph indicative of an activity occurring within a proximity of the patient related to provision of the healthcare service to the patient.

37. The computing device of claim 36, wherein the receiving data includes receiving data partially indicative of the health care service provided to the patient as of receipt of the request for information.

38. The computing device of claim 36,
wherein the display device is configured to display the information indicative of the probable fees and costs incurred to date in view of the previous estimate of the fees and costs for providing the healthcare service.

39. A computer program product comprising:
a non-transitory computer-readable medium having program instructions stored thereon, the program instructions which, when executed by a processor of a computing device, cause the computing device to perform a process including:
(i) interacting with a thin client device to receive a previously prepared estimate of fees and costs to deliver a healthcare service, wherein the healthcare service includes at least one of a diagnosis, treatment, or prevention of a particular disease, illness, injury, or other physical or mental impairment to a particular patient;

(ii) interacting with the thin client device to receive a request for information indicative of fees and costs incurred to date in providing the healthcare service to the particular patient;

(iii) interacting with the thin client device to receive data at least partially indicative of the healthcare service provided to the patient to date;

(iv) estimating, by the processor, probable fees and costs incurred to date in providing the healthcare service to the particular patient, the estimating based on the received data at least partially indicative of the healthcare service provided to the patient to date;

(v) estimating, by the processor, a specific day when a specified fees and costs threshold will be reached should the healthcare service continue to be provided to the patient based on the previously prepared estimate of fees and costs and the estimated probable fees and costs incurred to date; and (vi) eliciting an input from the patient via a mobile device associated with the patient, the elicited input from the patient modifying the data at least partially indicative of the healthcare service provided to the patient to date, the eliciting caused by outputting in substantially real time a notification to the mobile device associated with the patient in response to the specific day when the specified fees and costs threshold will be reached being before a previously estimated specific day when the specified fees and costs threshold will be reached, wherein the notification includes information indicative of the probable fees and costs incurred to date in view of the previous estimate of the fees and costs for providing the healthcare service and indicative of the specific day when the specified fees and costs threshold will be reached;

wherein the elicited input from the patient comprises a photograph taken by the patient using the mobile device, the photograph indicative of an activity occurring within a proximity of the patient related to provision of the healthcare service to the patient.

40. The computer program product of claim 39, wherein the receiving data includes receiving data partially indicative of the health care service provided to the patient as of receipt of the request for information.

41. The computer program product of claim 39, wherein the non-transitory computer-readable medium includes a computer storage media.

42. The computer program product of claim 39, wherein the non-transitory computer-readable medium includes a communication media.

43. A method implemented in a computing device, the method comprising:
electronically receiving, by a network interface of a server system, a previously prepared estimate of fees and costs to deliver a healthcare service, wherein the healthcare service includes at least one of a diagnosis, treatment, or prevention of a particular disease, illness, injury, or other physical or mental impairment to a particular patient;

electronically receiving, by the network interface of the server system, a previously prepared estimate of the fees and costs eligible for reimbursement by a healthcare coverage entity providing coverage to the patient for the healthcare service;

electronically receiving, by the network interface of the server system, data at least partially indicative of the healthcare service provided to the patient to date;

estimating, by a processing unit of the server system, probable fees and costs incurred to date in providing the healthcare service to the particular patient, the estimating based on the received data at least partially indicative of the healthcare service provided to the patient to date;

estimating, by the processing unit of the server system, a probable reimbursement by the healthcare coverage entity of the estimated probable fees and cost incurred to date in providing the healthcare service;

electronically estimating, by the processing unit of the server system, a specific day when a specified fees and costs threshold will be reached should the healthcare service continue to be provided to the patient based on the previously prepared estimate of fees and costs and the estimated probable fees and costs incurred to date; and eliciting an input from the patient via a mobile device associated with the patient, the elicited input from the patient modifying the data at least partially indicative of the healthcare service provided to the patient to date, the eliciting caused by outputting in substantially real time, by the network interface of the server system, a notification to the mobile device associated with the patient in response to the specific day when the specified fees and costs threshold will be reached being before a previously estimated specific day when the specified fees and costs threshold will be reached, wherein the notification includes information indicative of the probable reimbursement by the healthcare coverage entity of the estimated probable fees and cost incurred to date in providing the healthcare service and indicative of the specific day when the specified fees and costs threshold will be reached;

wherein the elicited input from the patient comprises a photograph taken by the patient using the mobile device, the photograph indicative of an activity occurring within a proximity of the patient related to provision of the healthcare service to the patient.

44. A computer-implemented method performed by a server system, comprising:

electrically receiving, by a network interface of a server system, a request for information indicative of fees and costs incurred by a particular patient being provided a healthcare service, wherein the healthcare service includes at least one of a diagnosis or treatment of a particular disease, illness, injury or other physical or mental impairment;

electrically receiving, by the network interface of the server system, data at least partially indicative of the healthcare service provided to the patient to date;

estimating, by a processing unit of the server system, probable fees and costs incurred to date in providing the healthcare service to the particular patient, the estimating based on the received data at least partially indicative of the healthcare service provided to the patient to date;

electronically estimating, by the processing unit of the server system, a specific day when a specified fees and costs threshold will be reached should the healthcare service continue to be provided to the patient based on the previously prepared estimate of fees and costs and the estimated probable fees and costs incurred to date; and eliciting an input from the patient via a mobile device associated with the patient, the elicited input from the patient modifying the data at least partially indicative of the healthcare service provided to the patient to date, the eliciting caused by outputting in substantially real time, by the network interface of the server system, a notification to the mobile device associated with the patient in response to the specific day when the specified fees and costs threshold will be reached being before a previously estimated specific day when the specified fees and costs threshold will be reached, wherein the notification includes information indicative of the probable fees and costs incurred in providing the healthcare service to the patient as of receipt of the request for information and indicative of the specific day when the specified fees and costs threshold will be reached;

wherein the elicited input from the patient comprises a photograph taken by the patient using the mobile device, the photograph indicative of an activity occurring within a proximity of the patient related to provision of the healthcare service to the patient.

45. A computer-implemented method performed by a server system, comprising:

electronically receiving, by a network interface of a server system, a request for information indicative of fees and costs incurred by a particular patient being provided a healthcare service, wherein the healthcare service includes at least one of a diagnosis or treatment of a particular disease, illness, injury or other physical or mental impairment;

electronically receiving, by the network interface of the server system, data at least partially indicative of the healthcare service provided to the patient as of receipt of the request for information;

estimating, by a processing unit of the server system, probable fees and costs incurred to date in providing the healthcare service to the particular patient, the estimating based on the received data indicative of at least part of services provided to date;

estimating, by the processing unit of the server system, a probable reimbursement by a healthcare coverage entity providing coverage to the patient for the healthcare service of the estimated probable fees and costs incurred to date;

electronically estimating, by the processing unit of the server system, a specific day when a specified fees and costs threshold will be reached should the healthcare service continue to be provided to the patient based on the previously prepared estimate of fees and costs and the estimated probable fees and costs incurred to date; and eliciting an input from the patient via a mobile device associated with the patient, the elicited input from the patient modifying the data at least partially indicative of the healthcare service provided to the patient to date, the eliciting caused by outputting in substantially real time, via the communications circuit, a notification to the mobile device associated with the patient in response to the specific day when the specified fees and costs threshold will be reached being before a previously estimated specific day when the specified fees and costs threshold will be reached, wherein the notification includes information indicative of:

(i) the probable fees and costs incurred to date in providing the healthcare service;

(ii) the probable reimbursement by the healthcare coverage entity of the estimated probable fees and costs incurred to date in providing the healthcare service; and (iii) the specific day when the specified fees and costs threshold will be reached; and wherein the elicited input from the patient comprises a photograph taken by the patient using the mobile device, the photograph indicative of an activity occurring within a proximity of the patient related to provision of the healthcare service to the patient.

* * * * *